United States Patent
Fink et al.

(10) Patent No.: US 8,108,916 B2
(45) Date of Patent: Jan. 31, 2012

(54) USER FRAUD DETECTION AND PREVENTION OF ACCESS TO A DISTRIBUTED NETWORK COMMUNICATION SYSTEM

(75) Inventors: Ian M. Fink, Austin, TX (US); James D. Keeler, Austin, TX (US)

(73) Assignee: Wayport, Inc., Irving, TX (US)

(*) Notice: Subject to any disclaimer, the term of this patent is extended or adjusted under 35 U.S.C. 154(b) by 1117 days.

(21) Appl. No.: 10/442,526

(22) Filed: May 21, 2003

(65) Prior Publication Data
US 2004/0236702 A1    Nov. 25, 2004

(51) Int. Cl.
G06F 7/04    (2006.01)
(52) U.S. Cl. ......................................................... 726/6
(58) Field of Classification Search .................... 726/27; 380/270
See application file for complete search history.

(56) References Cited

U.S. PATENT DOCUMENTS

| | | | |
|---|---|---|---|
| 5,335,265 A * | 8/1994 | Cooper et al. ............... | 455/410 |
| 5,345,595 A | 9/1994 | Johnson et al. | |
| 5,371,794 A | 12/1994 | Diffie et al. | |
| 5,457,737 A * | 10/1995 | Wen ............................. | 455/410 |
| 5,513,263 A | 4/1996 | White et al. | |
| 5,802,518 A * | 9/1998 | Karaev et al. ...................... | 707/9 |
| 5,805,803 A | 9/1998 | Birrell et al. | |
| 5,812,819 A * | 9/1998 | Rodwin et al. ................. | 703/23 |
| 5,889,958 A | 3/1999 | Willens | |
| 5,924,025 A | 7/1999 | Kaplan et al. | |
| 5,953,652 A * | 9/1999 | Amin et al. .................... | 455/410 |
| 5,978,669 A | 11/1999 | Sanmugam | |
| 5,987,606 A | 11/1999 | Cirasole et al. | |
| 5,996,011 A | 11/1999 | Humes | |
| 6,006,334 A * | 12/1999 | Nguyen et al. .................... | 726/5 |
| 6,202,156 B1 * | 3/2001 | Kalajan ........................... | 726/11 |
| 6,233,618 B1 | 5/2001 | Shannon | |
| 6,453,419 B1 | 9/2002 | Flint et al. | |

(Continued)

FOREIGN PATENT DOCUMENTS
EP    0 805 610 A2    11/1997
(Continued)

OTHER PUBLICATIONS

International Search Report and Written Opinion, International Application No. PCT/US2004/016052, Mailed Nov. 2, 2004.

Primary Examiner — David Garcia Cervetti
Assistant Examiner — Daniel Hoang
(74) Attorney, Agent, or Firm — Yudell Isidore Ng Russell PLLC

(57) ABSTRACT

A system and method are disclosed for user fraud protection and prevention of access to a distributed network communication system. A first set of identification data associated with a first network access are stored. A second set of identification data associated with a second network access are stored. The first and second sets of identification data comprise a first computing device identification and a second computing device identification, respectively. If one or more fraud indicators are determined in the two sets of identification data, then the first and/or second network access may be revoked. The fraud indicators may include, e.g., use of the same username with different computing device identifications, use of the same computing device identification at different geographical locations, violation of a threshold for computing device identifications, violation of a threshold for authentication failures, and violation of a threshold for rate of network propagation by a user account.

110 Claims, 9 Drawing Sheets

U.S. PATENT DOCUMENTS

| | | | |
|---|---|---|---|
| 6,564,327 | B1 | 5/2003 | Klensin et al. |
| 6,735,429 | B1 * | 5/2004 | Adamany et al. ............. 455/410 |
| 6,959,392 | B1 * | 10/2005 | Yamamoto et al. ................ 726/5 |
| 6,996,714 | B1 * | 2/2006 | Halasz et al. ................. 713/163 |
| 7,016,948 | B1 * | 3/2006 | Yildiz ........................... 709/221 |
| 7,266,364 | B2 * | 9/2007 | Itoh ............................... 455/410 |
| 2001/0048745 | A1 * | 12/2001 | Sheymov et al. ............ 380/247 |
| 2002/0174335 | A1 * | 11/2002 | Zhang et al. ................. 713/168 |
| 2003/0009695 | A1 * | 1/2003 | Sato ............................. 713/201 |
| 2003/0152067 | A1 * | 8/2003 | Richmond et al. ........... 370/352 |
| 2003/0217289 | A1 * | 11/2003 | Ammon et al. ............... 713/201 |
| 2003/0233580 | A1 | 12/2003 | Keeler et al. |
| 2004/0054774 | A1 * | 3/2004 | Barber et al. ................. 709/224 |
| 2004/0105416 | A1 * | 6/2004 | Rue ............................... 370/338 |
| 2004/0123053 | A1 * | 6/2004 | Karr et al. ..................... 711/152 |
| 2004/0252837 | A1 * | 12/2004 | Harvey et al. ................. 380/270 |

FOREIGN PATENT DOCUMENTS

| | | |
|---|---|---|
| WO | WO 00/27159 | 5/2000 |

* cited by examiner

USER FRAUD DETECTION AND PREVENTION OF ACCESS TO A DISTRIBUTED NETWORK COMMUNICATION SYSTEM

BACKGROUND OF THE INVENTION

1. Field of the Invention

This invention relates generally to detecting, preventing, and/or thwarting fraud and/or fraudulent use in a network communications system, where the network communications system and its methods comprise the enabling a network infrastructure to support multiple network providers and/or customers of multiple network providers.

2. Description of the Relevant Art

Various types of wired and wireless infrastructures are being developed to provide High-speed Internet Access (HSIA) to users of computing devices, such as portable computing devices (PCDs). Currently, numerous providers are attempting to install wired and wireless network infrastructures in various locations, such as airports, hotels, office buildings, etc. for use by various users. Many of these providers also provide subscription services to customers. These subscription services provide the end user with a single bill at the end of the month for all of his or her uses (or, in some cases provide for a pre-paid subscription service). The subscription may be provided by a HSIA network infrastructure provider, or the subscription may be provided by an "aggregator" that does not own or operate any networks, but provides infrastructure for enabling their customers to gain access at sites from one or more HSIA network providers. The party that has the end-user billing relationship is referred to herein as a "subscriber-owner" or "roaming partner."

Subscriber-owners often desire to provide services to their customers at a large number of locations, including locations that are not necessarily owned or operated by the subscriber-owner. Providing such subscription services at a locations not owned or operated by the subscriber-owner is often referred to as "roaming," and the subscriber is said to "roam" onto a third party network.

Roaming technology has been developed in other fields outside of HSIA such as telephone, cellular telephone, and dial-up Internet services. Roaming is a familiar term in cellular telephone networks in situations where a customer of one carrier may arrive in a region where the carrier does not have a physical presence but another provider has equipment. The customer connects to the third-party system and "roams" onto this network. The charges are automatically accumulated by the subscriber-owner and posted on the customer's monthly invoice. In the early days of cellular telephones, roaming was quite awkward. For example, to roam in some areas, a customer would have to dial a local number to inform the local carrier that the customer was in the carrier's region. This awkwardness was due to the fact that no standard mechanism or technology for exchange of credentials or billing information had been adopted. Today roaming in cellular telephone networks is nearly universal between all carriers. More importantly, it is convenient and unobtrusive for the end-users.

In an a situation analogous to the early days of roaming in cellular telephone networks, HSIA providers and subscriber-owners face a challenge of providing roaming services to their customers. At the present point in time, no standard has been adopted for exchange of credentials and billing information. Whereas there is a large amount of technology available for roaming in cellular telephone networks and dial-up ISPs, the mechanism for HSIA connections is quite different than either of these existing systems. HSIA connections are normally controlled via an access control list mechanism with a web-browser. In some cases, client software can also be used to aid in the connection process.

Roaming technology with regards to HSIA has similar and/or unique issues regarding fraud and/or fraudulent use such as in the telephone, cellular telephone, and dial-up Internet services industries.

A variety of networks are used to implement roaming technology for HSIA today. Computer networks include local area networks (LANs), metropolitan area networks (MANs), wide area networks (WANs), intranets, the Internet and other types of communications networks. Communication networks include those for conventional telephone service, cellular networks of different varieties, paging services and others. Networks are used for many purposes, including to communicate, to access data, and to execute transactions. For many reasons, including security, it is often necessary to confirm or authenticate the identity of a user before permitting access to data or a transaction to occur on the network. Further, authentication is of paramount importance in HSIA roaming technologies because it may permit the HSIA network provider and the roaming partner to enable one or more subscriber's use of one or more networks.

One known approach to computer network authentication is the use of user-specific passwords. Passwords provide some level of protection, but they are not fail-safe. One reason, passwords are vulnerable is that users may share them. Even if passwords are kept private, someone who wants to obtain a password badly enough may utilize random generators, keyboard monitors, or other techniques since some fraudulent activities focus on fraudulently obtaining subscriptions. Moreover, when dealing with unknown users, such as people who want to conduct an electronic transaction or HSIA roaming authentication over the Internet (or other equivalent communications networks), ad hoc passwords may not be practical.

SUMMARY OF THE INVENTION

One embodiment of the present invention comprises a system and method for user fraud protection and prevention of access to a distributed network communication system. The network system may include a plurality of access points coupled to a network. The network access points include wireless access points and may also include wired access points. Access points (APs) for the network may be widely distributed in various facilities, such as airports, hotels, mass-transit stations, and various businesses, such as business offices, restaurants, and stores, e.g., coffee shops or restaurants at an airport. The network may couple to a wide area network, such as the Internet. A plurality of network providers may provide network services, such as Internet access, over the network infrastructure.

In one embodiment, a user, also referred to as a subscriber, may access the network system through a portable computing device (PCD) using, for example, a wireless (or wired) network interface card. When in sufficiently close range to an access point, the PCD may wirelessly access the network system, or the PCD may be directly connected to a wired connection. Each PCD may store identification information which may uniquely indicate at least one network provider of a plurality of possible network providers. The identification information thus may designate the network provider (or providers) to which the user of the PCD is a subscriber. The identification information may take various forms, such as a System ID (SID), MAC ID, or other identification which may be used to identify the network provider to which the user has subscribed. When the PCD becomes close to an access point, the PCD may provide the identification information to the access point.

The system and method for fraud detection may include storing a first set of identification data associated with a first network access and a second set of identification data associated with a second network access. The first and second sets of identification data comprise a first computing device identification and a second computing device identification, respectively. If one or more fraud indicators are determined in the two sets of identification data, then the first and/or second network access may be revoked. The fraud indicators may include, for example, use of the same username with different computing device identifications, use of the same computing device identification at different geographical locations, violation of a threshold for computing device identifications, violation of a threshold for authentication failures, violation of a threshold for rate of network propagation by a user, and usage of particular RF channels during wireless network access.

BRIEF DESCRIPTION OF THE DRAWINGS

Other objects and advantages of the invention will become apparent upon reading the following detailed description and upon reference to the accompanying drawings in which.

Figure 1:
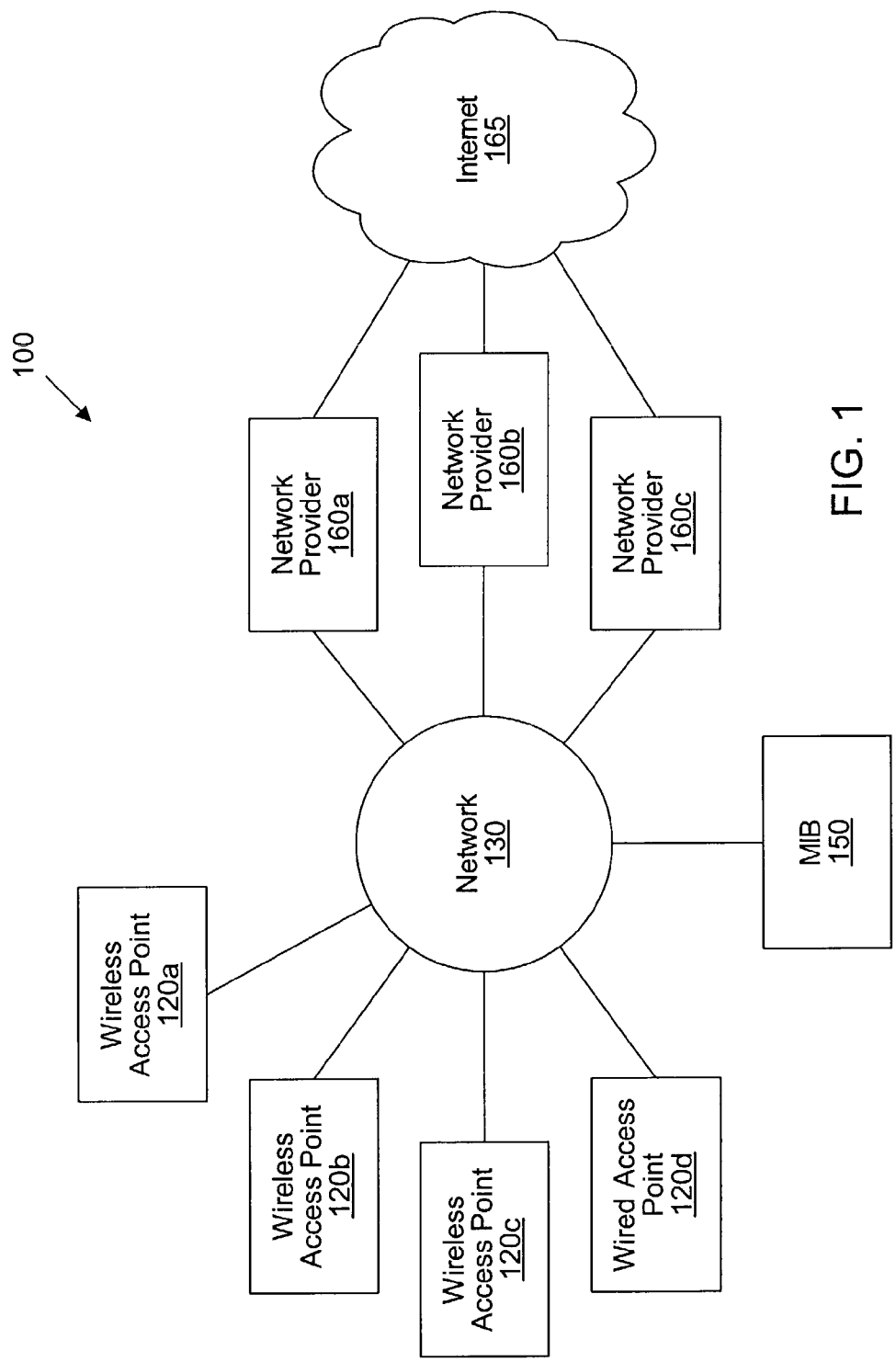
FIG. 1 is a block diagram of one embodiment of a network communication system according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

U.S. Pat. No. 5,835,061, titled "Method and Apparatus for Geographic-Based Communications Service", whose inventor is Brett B. Stewart, is hereby incorporated by reference in its entirety as though fully and completely set forth herein.

U.S. Pat. No. 5,969,678, titled "System for Hybrid Wired and Wireless Geographic-Based Communications Service", whose inventor is Brett B. Stewart, is hereby incorporated by reference in its entirety as though fully and completely set forth herein.

U.S. patent application Ser. No. 09/433,817 titled "Geographic Based Communications Service" and filed on Nov. 3, 1999, whose inventors are Brett B. Stewart and James Thompson, is hereby incorporated by reference in its entirety as though fully and completely set forth herein.

U.S. patent application Ser. No. 09/433,818 titled "A Network Communications Service with an Improved Subscriber Model Using Digital Certificates" and filed on Nov. 3, 1999, whose inventors are Brett B. Stewart and James Thompson, is hereby incorporated by reference in its entirety as though fully and completely set forth herein.

U.S. patent application Ser. No. 09/551,309 titled "System and Method for Managing User Demographic Information Using Digital Certificates" and filed on Apr. 18, 2000, whose inventors are Brett B. Stewart and James Thompson, is hereby incorporated by reference in its entirety as though fully and completely set forth herein.

U.S. patent application Ser. No. 09/767,374 titled "Distributed network communication system which allows multiple wireless service providers to share a common network infrastructure" and filed on Jan. 22, 2001, whose inventors are James Thompson, Kathleen E. McClelland, and Brett B Stewart, is hereby incorporated by reference in its entirety as though fully and completely set forth herein.

U.S. Provisional Patent Application Ser. No. 60/383,827 titled "Roaming" AND filed on May 29, 2002, whose inventors are James D. Keeler and Matthew M. Krenzer, is hereby incorporated by reference in its entirety as though fully and completely set forth herein.

U.S. patent application Ser. No. 10/341,761 titled "AUTHORIZATION AND AUTHENTICATION OF USER ACCESS TO A DISTRIBUTED NETWORK COMMUNICATION SYSTEM WITH ROAMING FEATURES" and filed on Jan. 14, 2003, whose inventors are James D. Keeler and Matthew M. Krenzer, is hereby incorporated by reference in its entirety as though fully and completely set forth herein.

U.S. patent application Ser. No. 10/387,337 titled "SYSTEM AND METHOD FOR USER ACCESS TO A DISTRIBUTED NETWORK COMMUNICATION SYSTEM USING PERSISTENT IDENTIFICATION OF SUBSCRIBERS" and filed on Mar. 11, 2003, whose inventors are James D. Keeler, Ian M. Fink, and Matthew M. Krenzer, is hereby incorporated by reference in its entirety as though fully and completely set forth herein.

FIG. 1—Network Communication System

FIG. 1 shows one embodiment of a distributed network communication system (NCS) 100. The NCS 100 may include one or more access points (APs) 120, preferably a plurality of APs 120. At least a subset of the APs 120 are wireless access points (APs) 120 which communicate with a portable computing device (PCD) 110 in a wireless fashion. Each wireless access point 120 may have a wireless connection or transceiver (e.g., an antenna) and may operate according to various wireless standards, such as wireless Ethernet (IEEE 802.11). One or more of the APs 120 may also be wired access points which communicate with a PCD 110 in a wired fashion.

Each access point (AP) 120 may be coupled to a network 130. The network 130 may comprise a wired network, a wireless network or a combination of wired and wireless networks. For example, the network 130 may be a standard "wired" Ethernet network which connects each of the wireless (and wired) APs 120 together. The network 130 may also be a wireless network based on IEEE 802.11, IEEE 802.15, IEEE 802.16, etc. The network 130 may form part of the Internet, or may couple to other networks, e.g., other local or wide area networks, such as the Internet.

The network 130 may also include or be coupled to other types of communications networks, (e.g., other than the Internet) such as the public switched telephone network (PSTN), whereby a user using PCD 110 may send and receive information from/to the PSTN or other communication network through a network provider. The network 130 may also include, or be coupled to, another wide area network 130, such as a proprietary WAN. The network 130 thus may be, or be coupled to, any of various wide area networks (WANs) or local area networks (LANs), including the Internet 165.

The APs 120 may be widely distributed in various facilities, such as airports, hotels, mass-transit stations, shopping malls, restaurants and other businesses, such as business offices, law firm offices, retail stores, etc. For example, where the APs 120 are distributed in an airport, one or more APs 120 may be distributed throughout various terminals in the airport, in an airline club, and in coffee shops, restaurants or rental car counters at the respective airport. The APs 120 may thus be primarily designed to service mobile users, wherein it may not be known ahead of time which mobile users will be accessing the network from which locations. Thus, the NCS 100 is preferably a distributed network system, with access points placed in locations to service mobile users. This differs from a conventional fixed local area network (LAN), where it is generally pre-configured as to which pre-determined users will be using which nodes in the fixed LAN on a day-to-day basis, and the relative access levels that these pre-determined users have is also pre-configured.

Each AP 120 may comprise information used to identify or select a network provider for a particular user, as well as related access information to enable the network provider to provide access. When in sufficiently close range to an AP 120, or when the PCD 110 is directly coupled to an access point 120 in a wired fashion, the PCD 110 may access the network utilizing a particular network provider, as discussed further below.

A user operating a PCD 110 may communicate with one of the APs 120 to gain access to network services, such as Internet access. The PCD 110 may have a wireless communication device, e.g., a wireless Ethernet card, for communicating with a wireless AP 120. The PCD 110 may instead have a wired communication device, e.g., an Ethernet card, for communicating with a wired AP 120.

The PCD 110 may be any of various types of devices, including a computer system, such as a portable computer, a personal digital assistant (PDA), an Internet appliance, a communications device, or other wired or wireless device. The PCD may include various wireless or wired communication devices, such as a wireless Ethernet card, paging logic, RF communication logic, a wired Ethernet card, a modem, a DSL device, an ISDN device, an ATM device, a parallel or serial port bus interface, or other type of communication device.

The PCD 110 preferably includes a memory medium which stores identification information indicating a network provider to which the user has subscribed. The indicated network provider may be one of a plurality of possible network providers that provide Internet access or other network services in a network system such as that shown in FIG. 1. The identification information may be a System ID (an IEEE 802.11 System ID), a Media Access Control (MAC) ID of a wireless Ethernet device comprised in the PCD 110, the name of the network provider, or other type of information that uniquely identifies one (or more) network providers. The identification information may be contained in a digital certificate or cookie, which may be stored in a web browser or in a memory medium of the PCD 110.

The PCD may be identified by one or more means of a PCD ID. A means of a PCD ID may comprise internal or external components such as peripherals of a PCD. These internal or external components providing a means PCD ID may comprise: a MAC ID, CPU ID, an internet protocol (IP) address, a subscriber identification module (SIM), a smart card, an electronic serial number (ESN), mobile information number (MIN), and mobile directory number (MDN). A means of a PCD ID may also comprise information stored in a memory medium of the PCD ID. This information may comprise: a cookie ID, a certificate ID, a biometric scan such as a retina scan, finger print, etc., or a string of characters. Combinations of these means may also serve as a means of a PCD ID.

Where the AP 120 is a wireless AP 120, the wireless communication may be accomplished in a number of ways. In one embodiment, PCD 110 and wireless AP 120 are both equipped with an appropriate transmitter and receiver compatible in power and frequency range (e.g., 2.4 GHz) to establish a wireless communication link. Wireless communication may also be accomplished through cellular, digital, or infrared communication technologies, among others. To provide user identification and/or ensure security, the PCD 110 may use any of various security mechanisms.

Where the AP 120 is a wired AP 120, the wired connection may be accomplished through a variety of different ports, connectors, and transmission mediums. For example, the PCD 110 may be connected through an Ethernet, USB, fire wire (IEEE 1394), serial, or parallel transmission cables, among others. The PCD 110 may also include various communication devices for connecting to the AP 120, such as wired Ethernet cards, modems, DSL adapters, ATM adapters, IDSN devices, or other communication devices. For example, a hotel may have Ethernet connections in the restaurants, shops, and guest rooms. An airline club, e.g., an airport Admiral's Club, may also have both wireless and wired connections for mobile users. A user may connect to a wired AP 120 through the use of a laptop computer (PCD 110), an Ethernet network card, and a network cable. This connection may have the same impact as a connection made to a wireless AP 120 as discussed above. In other words, a user using a wired PCD 110 is able to "roam" on various network infrastructures in the same manner as a user using a wireless PCD 110.

One or more network providers may each have an associated network device 160 coupled to the network 130. For example, FIG. 1 illustrates network devices 160 associated with three different network providers. The network devices 160 may take any of various forms, such as a computer system, router, bridge, etc. It is noted that network providers may provide network services at a location without being required to locate any equipment or bandwidth at a network location. For example, a network provider may combine virtual local area networks (VLANs) and IP tunneling to avoid having to locate any equipment or bandwidth at a particular network location.

A user operating a PCD 110 will typically have previously subscribed with one (or more) network providers. Examples of network providers include Wayport®, T-Mobile, and Softnet, among others. As discussed further below, when the PCD 110 of a user communicates with or through an AP 120, the respective network provider to which the user is subscribed is determined. If no previous affiliation with a network provider is detected, a default network provider may be selected. After the network provider is determined or selected, network access or services may be provided through that network provider. For example, data or packets from the respective PCD 110 may be routed to a destination designated by the respective network provider, such as the respective provider's network device 160. This effectively allows a plurality of network providers to each offer access on a common network infrastructure. This also allows subscribers of various network providers to "roam" on other networks, such as networks installed and/or maintained by other providers, or networks maintained by independent third parties.

The NCS 100 may also include a management information base (MIB) 150. The MIB 150 may be a mechanism, such as a memory, which may allow the persistent storage and management of information needed by network 130 to operate. For example, in one embodiment of the invention, the MIB 150 may store a data structure, such as a table comprising a list of identification information and a corresponding list of the plurality of possible network providers. The data structure may also store access information, which may comprise associated methods for providing data to the respective plurality of possible network providers. The access information may further comprise access level or privilege level information. Thus, the data structure may comprise a table having a plurality of tuples, with each tuple having the identification information, e.g., a System ID (SID), PCD ID, the corresponding network provider, and access information containing a method of access to the provider, possibly including a destination IP address or other methodology for accessing the provider's site. In an alternate embodiment, as noted above, the data structures which store this information may be comprised in each of the APs 120, or may be provided in various other locations.

As discussed further below, when a PCD 110 of a user begins communication with an AP 120, the network provider for the PCD 110 may be determined using this data structure. The memory medium containing the data structure may be accessed, and received network provider identification information from the respective PCD 110 may be used to index into the data structure or table to determine the network provider. The appropriate access method may also be accessed and used for enabling the network provider to provide network services, e.g., the access method may be used for providing the data from the respective PCD 110 to the determined network provider. Access level information may also be retrieved and used to determine a user's access to local network resources or Internet access.

The MIB 150 may store other information, such as a directory of all the elements (e.g., APs, PCDs, etc) in the network, the topology of the network, characteristics of individual network elements, characteristics of connection links, performance and trend statistics, and any information which is of interest in the operation of the network 130. For example, the MIB may store the precise longitude, latitude, altitude and other geographic information pinpointing the location of each access point.

One or more service providers 140 may also be coupled to the network 130 or other networks to which the network 130 is coupled, such as the Internet 165. As used herein, the term "service provider" is intended to include various types of service and information providers which may be connected to the network 130. The service provider 140 may take any of various forms and may provide any of various services or information. Each service provider 140 may include one or more computers or computer systems configured to provide goods, information, and/or services as appropriate for the service provider. The one or more service providers 140 may couple to the network in a wired or wireless fashion.

The NCS 100 may be geographic-based. In other words, the NCS 100 may provide information and/or services to the user based at least partly on the known geographic location of the user, e.g., as indicated by the APs 120 or as indicated by geographic information (e.g., GPS information) provided from the PCD 110. In one embodiment, the APs 120 are arranged at known geographic locations and may provide geographic location information regarding the geographic location of the user or the PCD 110. In another embodiment, the PCD 110 may provide geographic location information of the PCD 110 through the AP 120 to the network 130. For example, the PCD 110 may include GPS (Global Positioning System) equipment to enable the PCD 110 to provide its geographic location through the AP 120 to the network 130, such as to a service provider 140 coupled to the network 130.

Memory Medium and Carrier Medium

One or more of the systems described above, such as PCD 110, APs 120, MIB 150, and network providers 160 may include a memory medium on which computer programs or data may be stored. For example, each of the APs 120 and/or the MIB 150 may store a data structure as described above comprising information regarding identification information, corresponding network providers 160 and access information such as associated data routing methods. Each of the APs 120 and/or the MIB 150 may further store a software program for accessing these data structures and using the information therein to properly provide or route data between users (subscribers) and their corresponding network providers, or to selectively provide or route data depending on the access information.

The term "memory medium" is intended to include various types of memory or storage, including an installation medium, e.g., a CD-ROM, or floppy disks, a random access memory or computer system memory such as DRAM, SRAM, EDO RAM, Rambus RAM, NVRAM, EPROM, EEPROM, flash memory etc., or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. The memory medium may also be a distributed memory medium, e.g., for security reasons, where a portion of the data is stored on one memory medium and the remaining portion of the data may be stored on a different memory medium. Also, the memory medium may be one of the networks to which the current network is coupled, e.g., a SAN (Storage Area Network).

Also, each of the systems described above may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium in one or more of the above systems thus may store a software program or data for performing or enabling roaming and fraud-related services or selective network resource access within a NCS 100 or a NCS 102. A CPU or processing unit in one or more of the above systems executing code and data from a memory medium comprises a means for executing the software program according to the methods or flowcharts described below.

Various embodiments further include receiving or storing instructions and/or data implemented in accordance with the present description upon a carrier medium. Suitable carrier media include memory media as described above, as well as signals such as electrical, electromagnetic, optic, or other forms of analog or digital signals, conveyed via a communication medium such as networks and/or a wireless link.

Authentication, Authorization, and Accounting

As used herein, "AAA" is an abbreviation for authentication, authorization, and accounting. In one embodiment, AAA provides a system to control what computer resources users have access to and to keep track of the activity of users over a network (e.g., in IP-based networking). Authentication is the process of identifying an individual, may be based on a username and password combination, an X.509 certificate, or another means of a unique set of credentials. Authentication is based on the idea that each individual user will have unique information that sets him or her apart from other users. Authorization is the process of granting or denying a user access to network resources. Authorization may commence once the user has been authenticated through a means of a submission of valid creditials. The amount of information and the amount of services the user has access to depend on the user's authorization level. Accounting is the process of keeping track of a user's activity while accessing the network resources. Network resources may comprise the amount of time spent in the network, the services accessed while there, and the amount of data transferred during the session. Accounting data may be used for trend analysis, capacity planning, billing, auditing, and cost allocation.

AAA services often require a server that is dedicated to providing the three services. RADIUS (Remote Authentication Dial-In User Service) is an example of an AAA service used by many Internet Service Providers (ISPs). When a user connects to the ISP, the user's username and password may be passed to a RADIUS server or to an AAA interface server 169. The RADIUS server may then check that the information is correct and authorize access to the ISP's system. The RADIUS specification is maintained by a working group of the IETF (Internet Engineering Task Force), the main standards organization for the Internet. Other protocols for providing an AAA framework include DIAMETER (an extension and improvement of RADIUS, where the name is a play on words implying that the new is, at least, twice as good as the old), EAP (Extensible Authentication Protocol), TACACS (Terminal Access Controller Access Control System), TACACS+, and XTACAS. These are also intended for applications such as network access or IP mobility and are intended to work in both local AAA and roaming situations.

In one embodiment, the roaming system and method may provide at least two different methods for AAA of roaming users: one method for use with a browser, and one for use with client software. Both methods may use a standard RADIUS login with a RADIUS-qualified username and password.

FIG. 2

Figure 2:
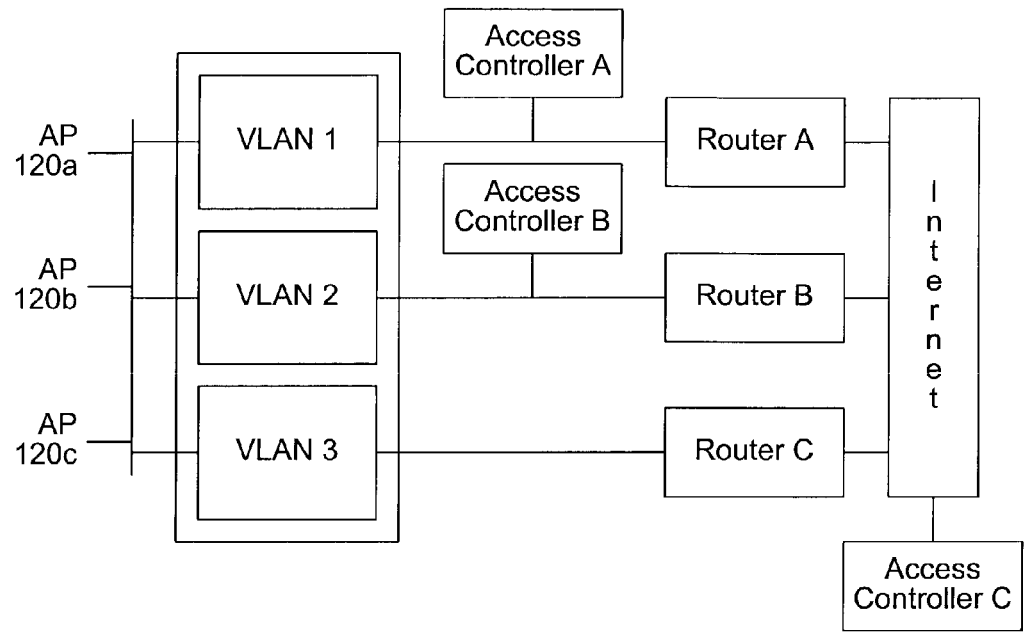
FIG. 2 is a more detailed block diagram of one embodiment of the network communication network system of FIG. 1 according to one embodiment.

FIG. 2 is a more detailed block diagram illustrating a portion of the wireless network system of FIG. 1. FIG. 2 illustrates an embodiment having three APs 120 which each couple through a respective virtual local area network (VLAN), labeled VLAN1, VLAN2 and VLAN3. Each of VLAN1, VLAN2 and VLAN3 in turn couple to respective routers 160, labeled router A, router B and router C, which are provided by the respective network providers A, B and C respectively. These routers in turn couple to the Internet. As shown, one or more access controllers, e.g., computer systems configured to determine or control network service access, may be provided for each of the network providers. The access controllers operate to verify user or subscriber access to the respective provider's network. FIG. 2 illustrates access controller A, access controller B and access controller C. As shown, access controllers A and B are coupled to router A and router B respectively. However, the access controller may be located outside of the local network 130, e.g., may be comprised on any of various locations on the Internet, as shown with respect to access controller C.

In this embodiment, the data structure may store an identification information/VLAN tag mapping, e.g., an SID/VLAN tag mapping, which operates to map the user to the appropriate VLAN of the user's network provider.

Figure 3:
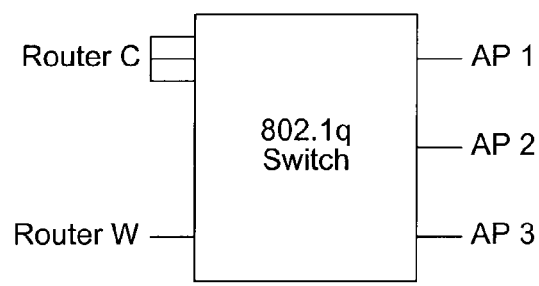
FIG. 3 is a block diagram of another embodiment of the network communication system of FIG. 1 according to one embodiment.

As shown, each of VLAN1, VLAN2 and VLAN3 may be supported in one or more Ethernet switches which support tagged VLANs (IEEE 802.1q). In addition, the switch may also support IEEE 802.1p, which provides various quality of service (QoS) metrics. This enables the switches to enforce certain predefined quality of service metrics to any given port or virtual port contained within the network. As shown in FIG. 3, it is also noted that a router may be present on more than one VLAN. As shown, FIG. 3 includes an 802.1q switch which couples to three access points referred to as access point 1 (AP1), access point 2 (AP2), and access point 3 (AP3). As shown, a router labeled router C may be coupled to two or more VLANs.

Using VLANs, each AP 120 preferably has the ability to transmit/receive on one or more VLAN IPs to one or more service providers. This permits, but does not require, that each network provider use its own network numbering plan. At most, each network provider may have an access controller and a router at each coverage location. As shown in FIG. 3, the access controller is not required to be physically located at the coverage location, but rather may be located anywhere.

FIG. 4

In one embodiment, a user may access internet services via a network provider 162 with whom the user has no prior relationship. As discussed above, the PCD 110 of the user is allowed to obtain network access through his or her previously chosen network provider, i.e., through the network provider to which the user has previously subscribed. Users may be permitted to roam on various network infrastructures from multiple network providers. In other words, a user who is a subscriber of network provider A (the roaming partner 170) may roam on a network infrastructure operated and maintained by network provider B (the network provider 162). Alternatively, certain portions of the network infrastructure may be built and maintained by a third party who is not a network provider, and subscribers of each of the various network providers (roaming partners 170) may be able to roam onto this network.

Figure 4:
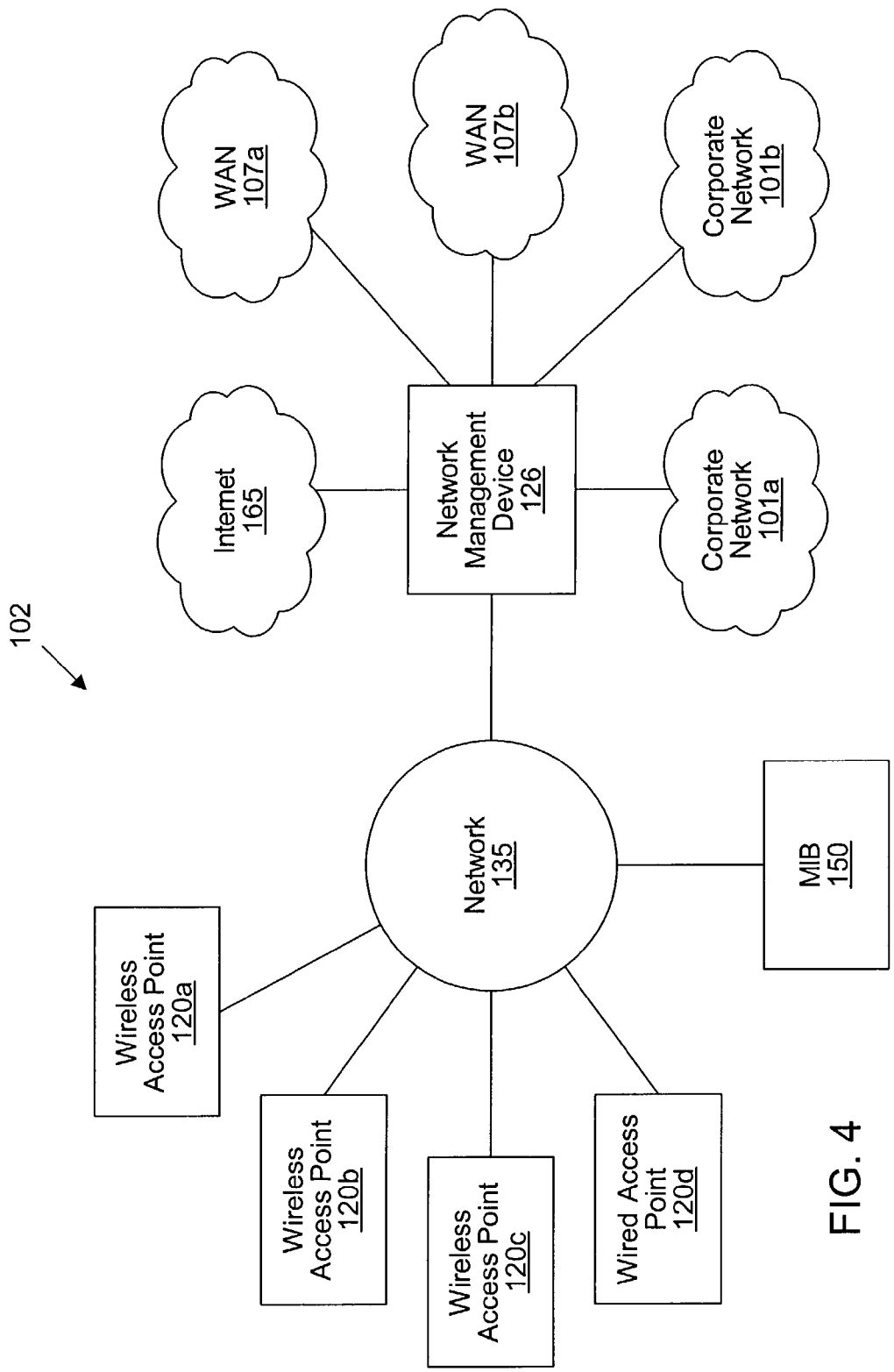
FIG. 4 is a block diagram of a network communication system according to a preferred embodiment.

As illustrated in FIG. 4, the user premises (e.g., a hotel or airport) may be configured with a NCS 102 comprising one or more wireless APs 120 and/or wired APs 120. These APs may be coupled to a network 135. The network 135 may comprise a wired network, a wireless network or a combination of wired and wireless networks. For example, the network 135 may be a standard "wired" Ethernet network which connects each of the wireless APs 120 and wired APs 120 together. The network 135 may also be a wireless network based on IEEE 802.11.

The network 135 may be coupled to other types of communications networks, (e.g., other than the Internet) such as a PSTN, whereby a user using PCD 110 may send and receive information from/to the PSTN or other communication networks. The network 135 may also be coupled to a wide area network (WAN) 107, such as a proprietary WAN. The network 135 thus may be, or be coupled to, any of various WANs 107, LANs, corporate networks 101, including the Internet 165. The network 135 may be coupled to a network management device (NMD) 126 where NMD 126 may serve as a means for authentication and access control from a network 135 or an AP 120 to the various WANs 107, LANs, corporate networks 101, including the Internet 165.

The NMD 126 may comprise the functionality of a router and/or a web-server that provides access to the Internet 165 and monitoring of client usage. The NMD 126 may also comprise an access control list (ACL). The ACL may serve as an access control means and may comprise a firewall and/or other security measures. The ACL may comprise a set of data that informs the operating system which permissions, or access rights, that each user or group has to a specific system object, such as a directory or file. Each object has a unique security attribute that identifies which users have access to it, and the ACL is a list of each object and user access privileges such as read, write or execute.

For wireless access, the APs may broadcast a network name (e.g., a Service Set Indentifier or SSID) identifying a wireless network from a network provider. If a wireless NIC in a PCD is set to accept an SSID of "Any," then the NIC may associate the PCD with a proximate wireless AP. If, on the other hand, the wireless NIC is set to associate only with fixed SSIDs, then the SSID must be set to the particular SSID for the network provider before proceeding. Depending upon the software of the PCD, this SSID configuration process may be manual or substantially automatic (e.g., allowing the user to select SSIDs from a list).

The NCS 102 may also include a MIB 150. The MIB 150 may be a mechanism, such as a memory, which may allow the persistent storage and management of information needed by network 135 to operate. For example, in one embodiment of the invention, the MIB 150 may store a data structure, such as a table comprising a list of identification information and a corresponding list of the plurality of possible networks and services. The data structure may also store access information, which may comprise associated methods for providing data to the respective plurality of possible networks and services. The access information may further comprise access level or privilege level information. Thus, the data structure may comprise a table having a plurality of tuples, with each tuple having the identification information. In an alternate embodiment, as noted above, the data structures which store this information may be comprised in each of the APs 120, or may be provided in various other locations.

The MIB 150 may store other information, such as a directory of all the elements (e.g., access points, portable computing devices, etc) in the network, the topology of the network, characteristics of individual network elements, characteristics of connection links, performance and trend statistics, and any information which is of interest in the operation of the network 135. For example, the MIB may store the precise longitude, latitude, altitude and other geographic information pinpointing the location of each access point.

The NCS 102 may be geographic-based. In other words, the NCS 102 may provide information and/or services to the user based at least partly on the known geographic location of a PCD 110, e.g., as indicated by the APs 120 or as indicated by geographic information (e.g., GPS information) provided from the PCD 110. In one embodiment, the APs 120 are arranged at known geographic locations and may provide geographic location information regarding the geographic location of the user or the PCD 110. In another embodiment, the PCD 110 may provide geographic location information of the PCD 110 through the AP 120 to the network 135. For example, the PCD 110 may include GPS (Global Positioning System) equipment to enable the PCD 110 to provide its geographic location through the AP 120 to the network 135. FIGS. 5 through 8

Figure 5:
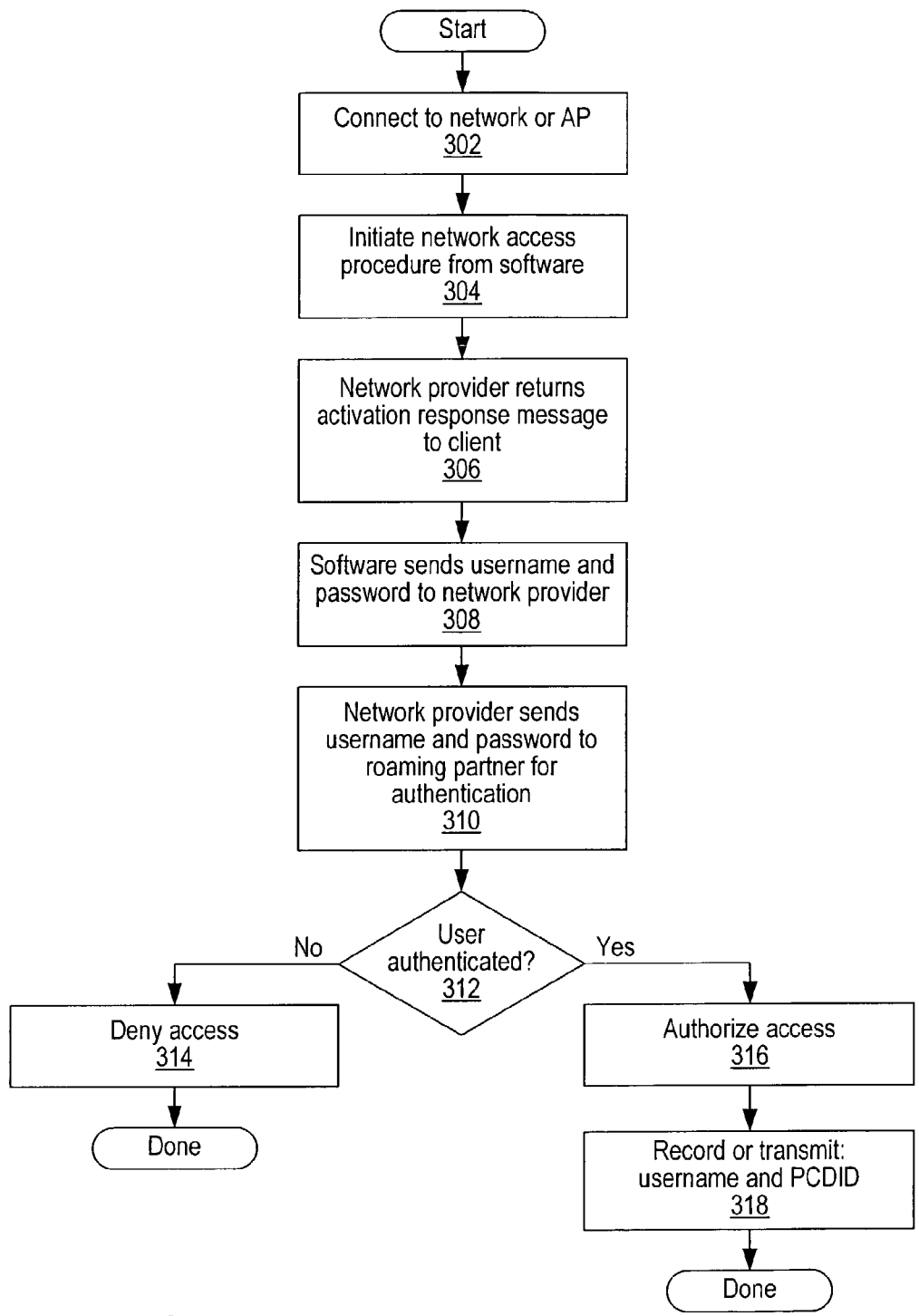
FIG. 5 is a flowchart diagram illustrating operation of allowing access to a network communication system using a roaming model according to one embodiment.

FIG. 5 is a flowchart diagram illustrating a method for providing roaming access using a software (client software) executed on a PCD and storing or transmitting information associated with the user's PCD according to one embodiment. This software may be embodied as a web browser, or it may be, embodied by or comprised within, a custom client software for interacting with a roaming system. In 302, the client computer (e.g., a PCD coupled to an AP) may connect to the network as disclosed herein (e.g., through an access point). The network provider may provide an ACL to screen unwanted traffic and attacks from outside the network. In one embodiment, the outbound ACL to the internet are initially "closed." In 304, a user may use the software on the PCD to send an access request to the network provider who operates the APs and local network. In one embodiment, the software may perform an HTTP "GET" to a web server or AAA interface server 169, not on the subnet to which the PCD belongs, to initiate the access sequence. In another embodiment, the software may perform an HTTP "GET" to a web server, on the subnet to which the PCD belongs, to initiate the access sequence. This web server may have the address of the default gateway or default router of the subnet to which the PCD belongs.

According to a preferred embodiment, when the PCD is not currently authorized for access, a NMD operated by the network provider may return an activation response message to the software in 306. The activation response message may include information that is usable to access the internet (e.g., a router address, an AAA interface server 169 address, or another network address). The activation response message may be returned to the software as an HTTP redirect message to the router's "Terms and Conditions" web page.

In 308, the software may then send the user's username and password to the network provider (e.g., at the router address indicated by the activation response message). The software may originate an HTTP POST operation to the above-described web server at the IP address implied by the logon URL at TCP port 443 utilizing an HTTPS (secure HTTP) connection over TCP. The POST parameters may be constructed by appending the arguments "username" and "password" to the {Query parameters} returned in the activation response HTML message. The contents of the username and password fields may be encoded as "text/plain," and the username may include the full NAI (Network Access Identifier) including appropriate roaming-partner prefixes.

In 310, the network provider may then send the username and password to a roaming partner for authentication/authorization. The roaming partner is another network provider with whom the user subscribes for internet access. In one embodiment, the industry-standard AAA mechanism, such as RADIUS, may be used for authentication/authorization. When a valid login attempt is received from the client software, and the RADIUS username begins with a roaming-partner prefix of the form "ROAMING_PARTNER/", the network provider 162 may send a valid RADIUS authorization request (i.e., an Access-Request) to the AAA server 168*b* of the roaming partner 170 using standard RADIUS proxy procedures.

In 312, the roaming partner may determine whether the user account is authenticated (e.g., using the user's RADIUS-compliant username and password) and send an appropriate authentication response back to the network provider. In one embodiment, the roaming partner 170 may attempt to deliver the authentication request to the appropriate authentication authority. The roaming partner 170 may then return the response (typically Access-Accept or Access-Reject) returned by the authentication authority. In one embodiment, the roaming partner 170 will not return vendor-specific RADIUS attributes sent by the authentication authority. If no response is received from the authentication authority, the roaming partner 170 may return an Access-Reject response to the network provider 162.

If the authentication response indicates that the user account has not been authorized, then the network provider may deny access to the network for the user in 314. If the authentication response indicates that the user account has been authorized, then the network provider may authorize access to the network for the user in 316.

In step 318, the network provider may record information about the user and his or her PCD comprising, for example, the username and PCD ID. In one embodiment, information may be stored on the AP or on another computing device coupled to the network. In another embodiment, step 318 may transmit information about the user and his or her PCD comprising: username and PCD ID. This information may be transmitted to one or more APs or computing devices coupled to the network. This transmission may be directed to one or more destinations, or it may be broadcasted (e.g., to a broadcast address of an IP network, to a multicast group, via wireless radio broadcast, etc.). To provide identification and/or ensure security, the network provider may use any of various security mechanisms for a storage or a transmission.

Figure 6:
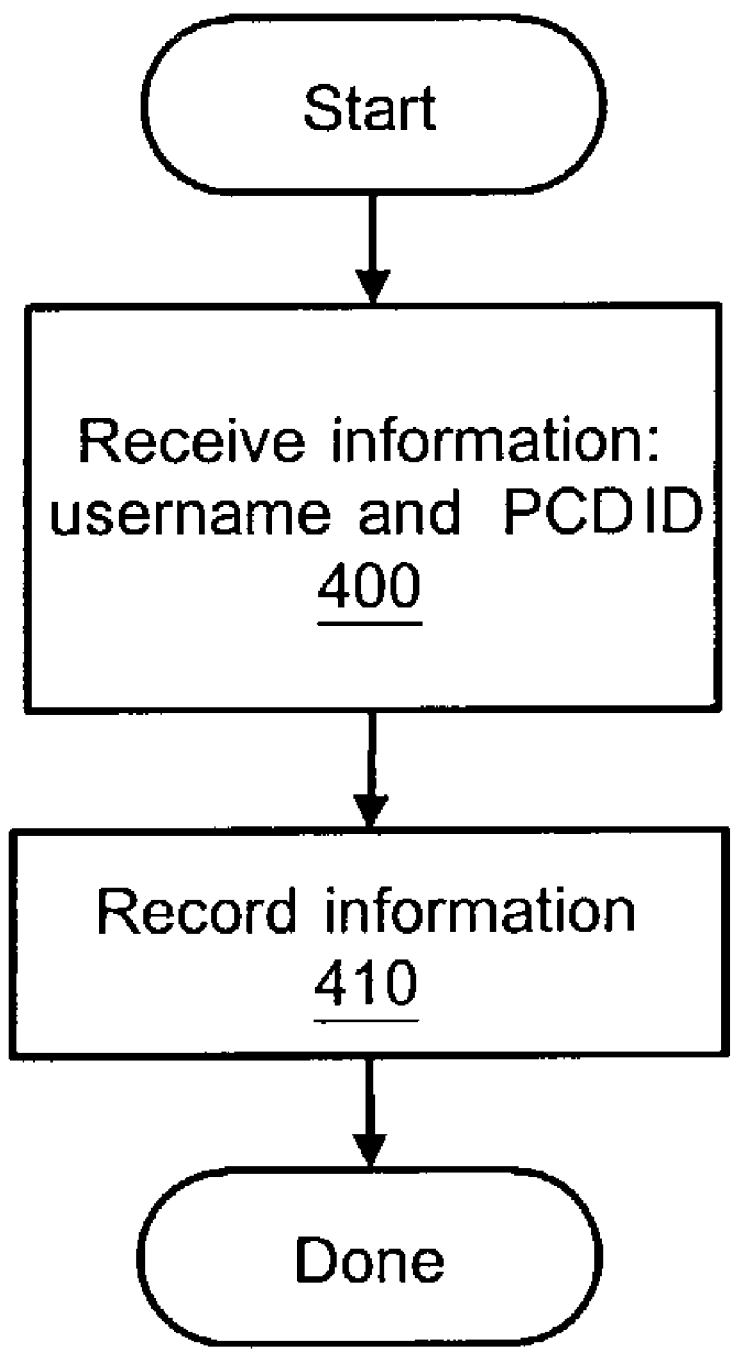
FIG. 6 is a flowchart diagram illustrating a storage of PCD ID and its associated information according to one embodiment.
Figure 7:
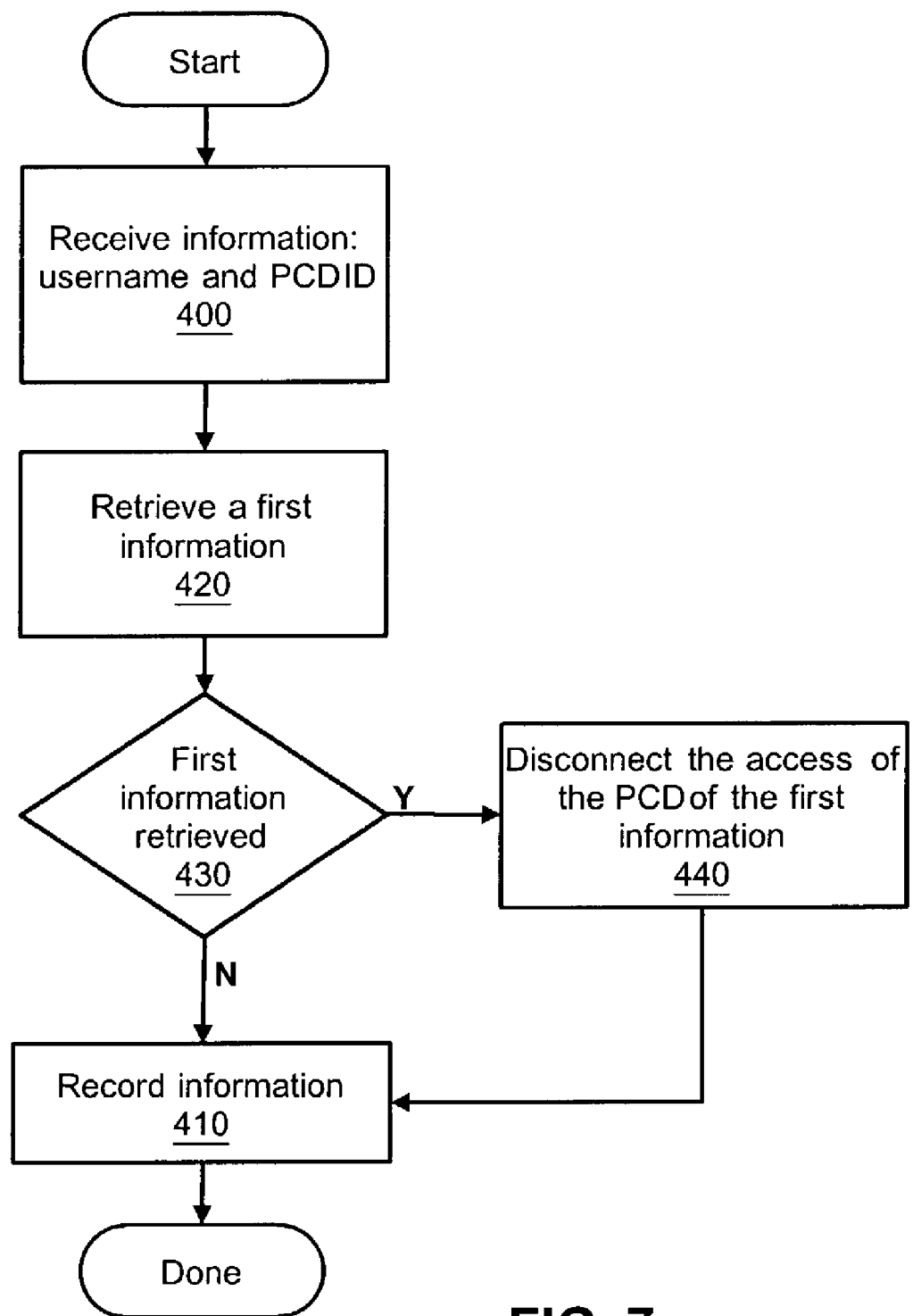
FIG. 7 is a flowchart diagram illustrating a storage of PCD ID and its associated information and a disconnect of a first user session according to one embodiment.
Figure 8:
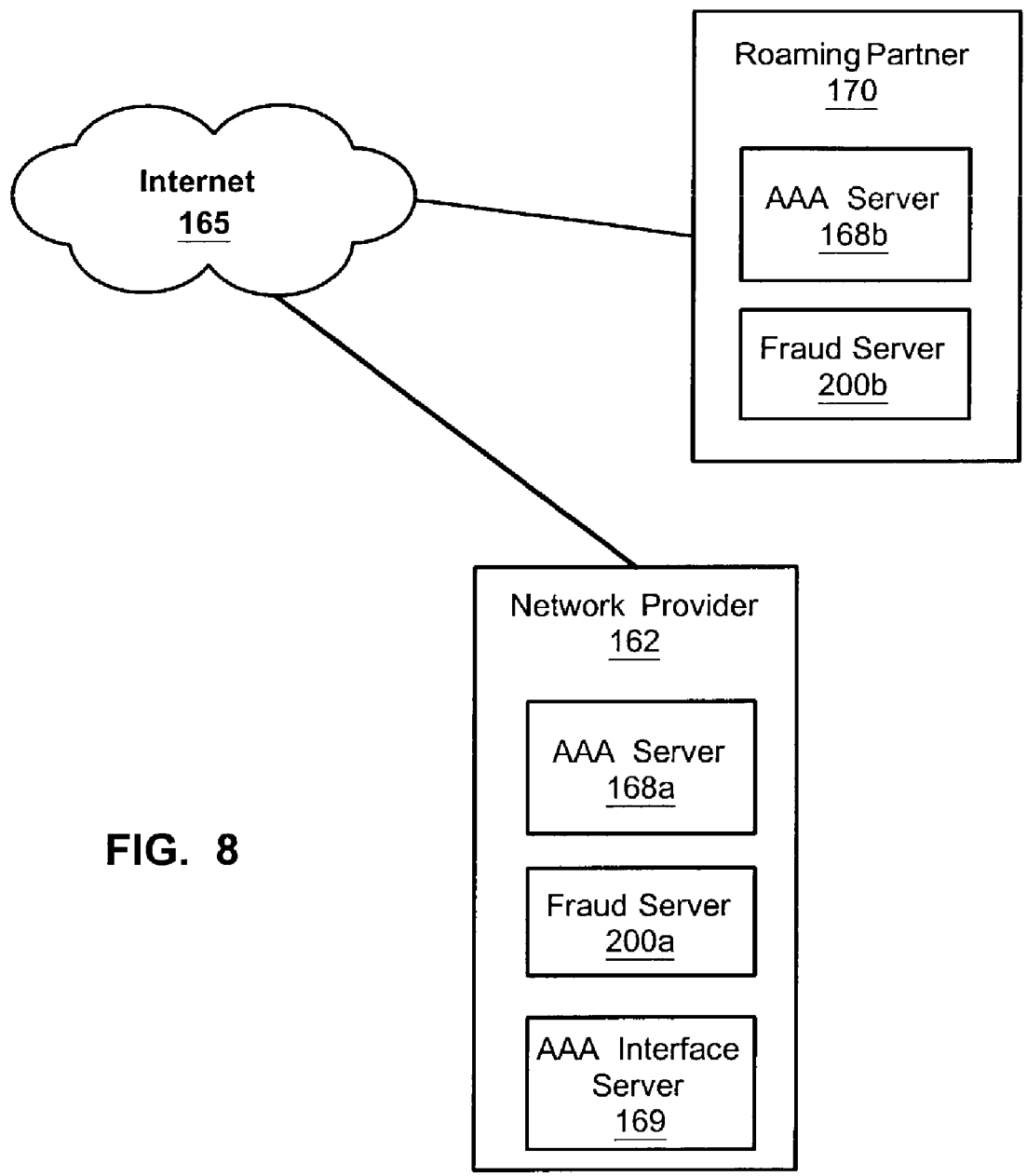
FIG. 8 is a block diagram of a network system including a network provider and a roaming partner according to one embodiment.

FIGS. 6 and 7 are flowchart diagrams which illustrate storage of a PCD ID and its associated information and a disconnect of a first user session according to one embodiment. The information, received in step 400, may be received by a fraud server 200*a* of the network provider 162 and/or by a fraud server 200*b* of the roaming partner 170, where the fraud server may be coupled to a network suitable for receiving such information. In one embodiment, the fraud server may be coupled to the Internet 165. In other embodiments, the fraud server may be coupled to other types of communications networks (e.g., other than the Internet) including but not limited to a PSTN, another wide area network 130 such as a proprietary WAN, WAN 107, corporate network 101, a LAN, a wireless local area network (WLAN), a cellular phone network, a metropolitan area network, or other wired or wireless networks. In step 410, the fraud server may store this information relating to a user access of the network in a memory medium or in a database of the server. In one embodiment, the fraud server may transmit this information to a second server, where the second server may store this information in a memory medium or in a database of the second server. Additional information relating to the PCD such as IP address, subnet, or location may be stored as well. This additional information may come from a MIB 150 or a database.

In one embodiment, the fraud server may attempt to retrieve, in step 420, the information relating to a first user access which was stored in step 410. In step 430, it may be determined if the attempt to retrieve the information was successful. If the information could not be retrieved, then in step 410, the information may be stored as described above. If the first information was retrieved, however, then in step 440 the fraud server may transmit a message to revoke the first access of the PCD. This information may be transmitted to one or more APs and/or computing devices coupled to the network. This transmission may be directed to one or more destinations, or it may be broadcasted (e.g., to a broadcast address of an IP network, to a multicast group, via wireless radio broadcast, etc.). To provide identification and/or ensure security, the fraud server may use any of various security mechanisms for a transmission.

In one embodiment, a first AP or a computing device such as an NMD 126, the subscriber used for a first access by a PCD, may receive the information transmitted, in a step 440, by a second AP or computing device used for a second access by the PCD. After receiving this information, the first AP or computing device may modify an ACL to revoke access of it or through it by the PCD. In another embodiment, a first AP or computing device, the subscriber used for the first access by a PCD, may receive the information transmitted, in a step 440, by a fraud server 200. After receiving this information, the first AP or computing device may modify an ACL to revoke access of it or through it by the PCD.

In other embodiments, a fraud server 200, an AP 120, a computing device, and/or a NMD 126 may store information associated with each PCD ID used for access of a network. This information may comprise, for example: a geographic region of use, an NMD ID, an IP address, an AP ID, a subnet, a network ID, a PCD ID, a username, and/or a hash of a username (such as an MD5 or SHA-160 hash). To provide identification and/or ensure security, the fraud server, the AP, the computing device, and/or the NMD may use any of various security mechanisms for an information storage.

Geographic locations may be associated with information that may comprise subnets, areas of arbitrary size, networks, one or more portions of networks, NMDs, and/or APs. This information may be stored in a memory medium or database of a network provider or a roaming partner. With this information, it may be possible to establish more information associated with a PCD ID used for access.

FIG. 9

Figure 9:
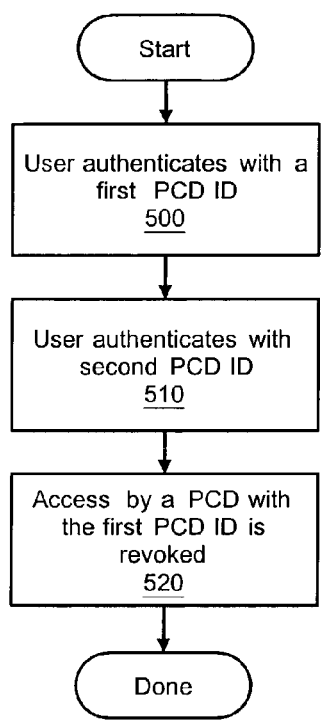
FIG. 9 is a flowchart diagram illustrating a disconnect of a first user session according to one embodiment.

FIG. 9 illustrates a preferred embodiment of a process of using a plurality of PCD IDs for access at one or more geographic locations. In step 500, a first user authenticates, with a username, for network access by a PCD with a first PCD ID. A PCD may have a plurality of PCD IDs, such as different MAC IDs, associated with different types of network connectivity which may comprise wireless and wired access, for example. As shown above, a network element of the network provider or the roaming partner may store or transmit information associated with the first access with the first PCD ID. In step 510, the first user authenticates, with the username, for a second access with a PCD with a second PCD ID. The PCD used for the second access may be the same PCD used for the first access, or it may be a second PCD. Regardless of the PCD used for the second access, the first PCD ID used for the first access differs from the second PCD ID used for the second access. The username is the same for each authentication.

It may be unknown if the second access is by a second user, where the second user is using the username of the first access. This may pose a concern for the network provider and/or roaming partner if the username has an account with unlimited access. Thus, if the first user with the username shares his or her username (and password) with the second user, revenue for the network provider and/or the roaming partner may be lost, since the second user may be obtaining access essentially for free. Further, the first user may charge the second user for access through the use of the first user's username (and password) for access, and the first user may not be authorized to do so by the network provider and/or the roaming partner.

The second authentication with the second PCD ID may be instantiated by the first user. It is may be unknown if this second authentication is by the same PCD used for the first authentication. The PCD ID may be based on a MAC ID. The first user may have used a first network interface card (NIC), with a first MAC ID, for the first authentication. For the second authentication, the first user may have used a second NIC, with a second MAC ID. Switching NICs may not be uncommon, especially when accessing wired and wireless networks or other different types of networks such as an IEEE 802.11b network and an IEEE 802.11a network. The use of the second PCD ID may indicate the simultaneous use of a second PCD. The network provider and/or the roaming partner may lose revenue for simultaneous use of a plurality of PCDs by the first user. The information associated with these two authentications may be used as one or more fraud indicators or may be used in a fraud risk level system, method, or process.

In step 520, access by a PCD with the first PCD ID is revoked. This may be accomplished by one or more methods, processes, or systems described above. If the same PCD is used for the second authentication and is identified as the second PCD ID, the access by this PCD will not be revoked. In one embodiment, following step 520, a PCD with the first PCD ID may not have access until it is re-authenticated. As described above, one or more network elements, such as an AP or NMD used to couple a PCD with the first PCD ID to a network, may modify one or more ACLs such that access by a PCD with the first PCD ID is revoked or modified. The information associated with these authentications or attempts may be used to as on or more fraud indicators or may be used in a fraud risk level system, method, or process.

FIG. 10

Figure 10:
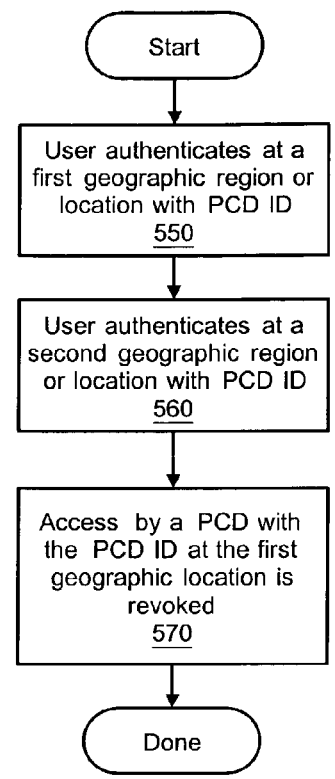
FIG. 10 is a flowchart diagram illustrating a disconnect of a first user session according to one embodiment.

FIG. 10 illustrates a preferred embodiment of a process of using a plurality of geographic locations for access with a single PCD ID. In step 550, a first user authenticates, with a username, for network access using a PCD with a PCD ID at a first geographic location. As shown above, a network element of the network provider or the roaming partner may store or transmit information associated with the first access with the PCD ID. In step 560, a user authenticates, with the username, for a second access using a PCD with the same PCD ID at a second geographic location. The PCD used for the second authentication may be the same PCD used for the first access, or it may be a second PCD. Regardless of PCD used for the second access, the first geographic location used for the first access differs from the second geographic location used for the second access. The geographic locations may comprise: a network, a portion of a network such as an access point, and/or an area of arbitrary size.

PCD IDs may be duplicated or "cloned." "Cloning" of a cellular phone or an ESN (Electronic Serial Number, e.g., of a cellular phone) poses problems, for example, in cellular telephone networks by causing loss of revenue or errors in billing. With PCD IDs, it may be unknown if the second authentication is by a second PCD, where the second PCD used for access is accomplished by the username of the first authentication. As discussed with reference to FIG. 9, a concern may arise if the username has an account with unlimited access. If the first user with the username shares his or her username (and password) with a second user and both PCDs used for access use the same PCD ID, revenue for the network provider and/or the roaming partner may be lost, since the second user may be obtaining access essentially for free. Further, the first user may charge the second user for access through the use of the first user's username (and password) for access, and the first user may not be authorized to do so by the network provider and/or the roaming partner. The information associated with these two authentications may be used to as one or more fraud indicators or may be used in a fraud risk level system, method, or process.

In 570, access by a PCD with the PCD ID at the first geographic location is revoked for access at the first geographic location. This may be accomplished by one or more methods, processes, or systems described above. In one embodiment, following step 570, a PCD with the PCD ID may not have access at the first geographic location until it is re-authenticated. As described above, one or more network elements, such as an AP or NMD used to couple a PCD with the PCD ID to a network, may modify one or more ACLs such that access by the PCD with the PCD ID is revoked or modified.

In one embodiment, a fraud server 200 may detect an abnormal rate-increase of subscriber-usage of a roaming partner. This may indicate a security breach of the roaming partner such as accounts may have been stolen or "cracked." The fraud server may utilize one or more processes to deny access to these accounts used during and/or after the rate increase, or it may deny access to all accounts associated with the roaming partner.

A subscriber may use a plurality of PCDs and/or PCD IDs. In one embodiment, a threshold (e.g., a quantity) of PCD IDs for a roaming partner or a subscriber may be set by a fraud server 200. When this threshold is reached, access may be denied to any additional PCD ID of the subscriber and/or roaming partner, or access may be denied regardless of PCD ID. A PCD ID threshold may be increased or decreased on a per subscriber basis and/or on a per roaming partner basis. Moreover, one or more PCD IDs may be cleared from time-to-time for any subscriber or roaming partner. If more than one PCD ID is allowed by the fraud server, the fraud server may be configured to not allow simultaneous use of a plurality of PCD IDs for access or authentication.

Information associated with each PCD ID stored, according to one embodiment, may comprise a time-period of none-use where the PCD ID may not be counted towards a threshold. For instance, a time after a last use of a PCD ID plus the time-period of none-use would not be counted as a PCD ID towards the threshold of PCD IDs for a subscriber and/or roaming partner. The storage of a PCD ID may comprise a "half-life" where the PCD ID's "counted weight" diminishes over time from its last known use.

Further, it may be beneficial or necessary to a network provider and/or a roaming partner if only one account or username of the roaming partner be used on only one PCD ID. In other words, a plurality of accounts or usernames may not use the same PCD ID, according to one embodiment. Thus, a fraud server 200 may deny access of a PCD used by second username when the PCD's PCD ID is associated with a first username. This denial-of-use of the PCD by the second username may be time-based. For example, the PCD, with the PCD ID, may not be used by the second username until some time after the first username has logged in or logged off.

In one embodiment, a fraud server 200, an AAA server 168, and/or an AAA interface server 169 may have a threshold for authentication failure, where the threshold may be set on a per subscriber and/or a per roaming partner basis.

For example, a valid username may be attempted for authentication at one or more geographic locations; yet, a number of attempts for authentication may fail. This number may be cumulative, or it may be based upon a function of time such as a rate of attempts with non-authentication. This may indicate fraud, or it may indicate someone is trying to crack, hack, or hi-jack the subscriber's account. The information associated with these authentications and/or failures may be used to as one or more fraud indicators or may be used in a fraud risk level system, method, or process.

In another example, a plurality of usernames, associated with a roaming partner, may be attempted for authentication at one or more geographic locations; yet, a number of attempts for authentication may fail. This number may be cumulative, or it may be based upon a function of time such as a rate of attempts with non-authentication. This may indicate fraud, or it may indicate someone is trying to crack, hack, or hi-jack a plurality subscriber's account. This may apply to non-valid usernames and/or non-valid passwords for accounts associated with the roaming partner. The information associated with these authentications and/or failures may be used to as one or more fraud indicators or may be used in a fraud risk level system, method, or process.

Information regarding a location and a time of a first use of a PCD of a subscriber may be used in a comparison with a location and a time of a second use of the a PCD of the subscriber, according to one embodiment. The comparison may be used to determine how quickly the subscriber apparently propagated within a network or from one network to another. Further, a threshold may be set, such that if the rate of propagation exceeds the threshold, fraudulent use may be assumed. The information associated with these authentications and/or failures may be used to as one or more fraud indicators or may be used in a fraud risk level system, method, or process.

Figure 11:
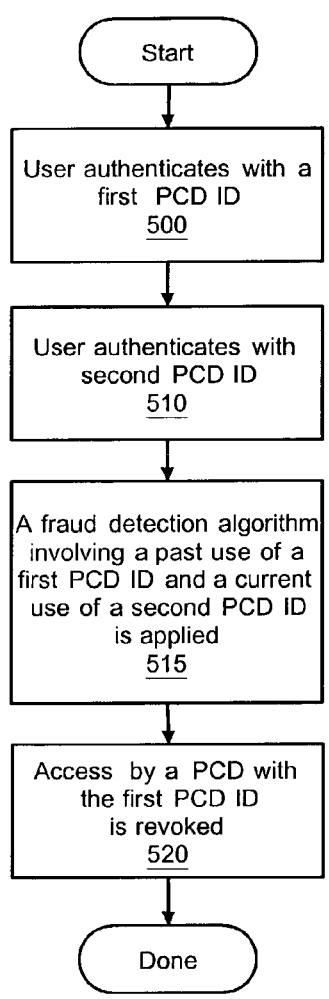
FIG. 11 is a flowchart diagram illustrating a disconnect of a first user session with a means of a fraud detection algorithm according to one embodiment.
Figure 12:
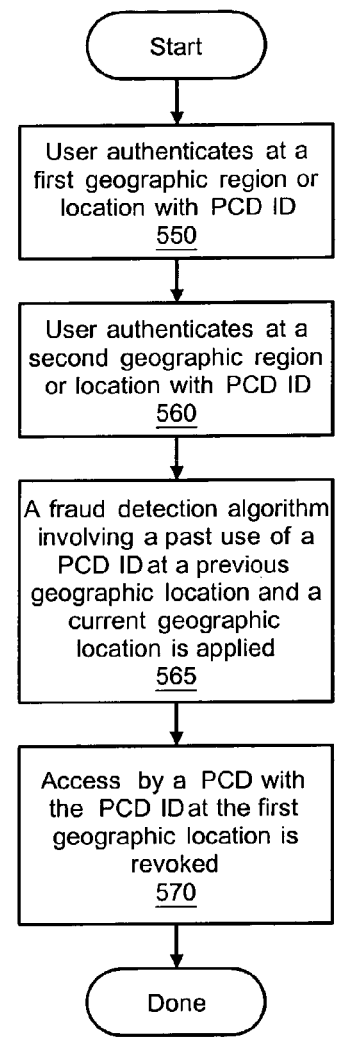
FIG. 12 is a flowchart diagram illustrating a disconnect of a first user session with a means of a fraud detection algorithm according to one embodiment.

In one embodiment, the data stored on subscribers and their uses of their PCDs, with PCD IDs, may be used with an adaptive algorithm such as a neural network Bayesian estimator or similar probability estimator to detect abnormal, possible fraudulent use, or fraudulent use of a subscriber's account. The algorithm may be used in a fraud detection and/or a fraud prevention system, method, or process. FIG. 11 illustrates the use of such an algorithm in step 515. FIG. 12 illustrates the use of such an algorithm in step 565.

In one embodiment, a subscriber's account may be suspended or de-activated for fraud and/or fraudulent use. The subscriber's account may be suspended or de-activated for a suspicion of fraud and/or fraudulent use. The subscriber may contact the roaming partner with which he or she has an associated roaming user account for a re-activation of the user's account. The subscriber may contact the network provider of which he or she has an associated roaming user account for a re-activation of the user's account and/or username. The roaming partner and/or the network provider may verify the user's (i.e., account owner's) credentials or identification. The owner's credentials or identification may comprise, for example, a physical address, a former physical address, a phone number, a former phone number, a PCD ID, a social security number, a portion of a social security number, a bank account ID, a driver's license ID, a phone number called (on the user's phone bill), a maiden name, a mother's maiden name, a date of birth, a personal ID, a passport ID, a customer ID, a credit card number, an email address, an ESN, or a certificate ID. Once the user has been verified as the valid-user of the account, the roaming partner or the network provider may re-activate the user's account. The roaming partner and/or the network provider may assign a new identification, such as a new username and/or password, to the subscriber's account. This re-activation may include contacting one or more network providers or roaming partners to convey the re-activation of the subscriber.

Wireless Access Point Usage of Multiple Channels

A wireless AP 120 can use one of a plurality of different RF (radio frequency) channels for communication with portable computing devices of users. For example, a wireless AP 120 can use one of RF channels 1 through 11. As is well known, RF channels 1, 6 and 11 are non-overlapping, with the remainder of these channels being partially overlapping with other channels.

According to one embodiment of the present invention, each wireless access point can communicate on one or more, e.g. a plurality of or all of, the available wireless channels, e.g., the available RF channels. Furthermore, each AP 120 can control which channel a PCD 110 of a client is able to use. In one embodiment, each portable computing device may scan each of the RF channels until it detects a AP 120 at one of the channels.

In one embodiment, one or more of the wireless APs may each utilize a plurality of the RF channels, e.g., may use each of the non-overlapping channels 1, 6 and 11 to effectively provide up to three times the channel capacity. Thus, the AP 120 may be able to control allocations of a plurality or all of the respective RF channels to selectively obtain higher bandwidth when appropriate, or to simply accommodate a greater number of portable computing devices (PCDs) 110. Thus, if a wireless AP using only one RF channel could only handle fifty portable computing devices 110 on that respective channel, the wireless AP may operate to use all three non-overlapping RF channels to effectively triple this capacity to a total of 150 simultaneous PCDs 110.

As another example, if the AP 120 is only communicating with one PCD 110, then the AP 120 may optionally or selectively use each of the three non-overlapping RF channels to produce effectively three times the bandwidth for this communication. As additional portable computer devices come into communication with the respective AP 120, the AP 120 may selectively allocate different channels to different ones of these portable computing devices as needed. Further, if more than three portable computing devices are communicating with the respective wireless AP, the AP 120 may partition one or more of the respective channels for the respective users, such as using wireless Ethernet Collision Sense Multiple Access/Collision Detection (CSMA/CD) or other multiple access schemes such as TDMA, FDMA, or CDMA, among others.

In one embodiment, a subscriber may be allowed to use one or more wireless channels. For example, the subscriber may only be allowed to use a channel 6 for roaming access with a network provider which may be according to the terms of his or her account or terms of an agreement between a roaming partner of the subscriber and/or between an agreement between the roaming partner and a network provider. A PCD may attempt to authenticate on a channel different from channel 6. This may indicate a fraudulent use. This may also indicate that a username has been compromised. The information associated with this authentication or attempted authentication may be used as one or more fraud indicators or may be used in a fraud risk level system, method, or process.

In another embodiment, a subscriber may be able to use a plurality of channels simultaneously when accessing a network of a network provider. For example, a subscriber may be able to use the non-overlapping channels of 1 and 6 for simultaneous use to effectively double his or her effective bandwidth. A PCD may attempt to authenticate or authenticate with the subscriber's username and may attempt to simultaneously use channels 1, 6, and 11. Thus, tripling his or her effective band-width. This may indicate a fraudulent use. A PCD may attempt to authenticate or authenticate with the subscriber's username and may attempt to simultaneously use channels 6 and 11 which may also indicate a fraudulent use. These may also indicate that a username has been compromised. The information associated with each of these authentication or attempted authentication may be used as one or more fraud indicators or may be used in a fraud risk level system, method, or process.

A network provider may assign one or more channels to a roaming partner, according to one embodiment. For example, subscribers of the roaming partner may only be allowed to use a channel 6 for roaming access with a network provider according to the terms of an agreement between the roaming partner of the subscriber and the network provider. A PCD may attempt to authenticate or authenticate with the subscriber's username, associated with the roaming partner, on a channel different from channel 6. This may indicate a fraudulent use. This may also indicate that the username has been compromised. The information associated with this authentication or attempted authentication may be used as one or more fraud indicators or may be used in a fraud risk level system, method, or process.

In one embodiment, subscribers of a roaming partner may be able to use a plurality of channels simultaneously when accessing a network of a network provider. For example, subscriber of the roaming partner may be able to use the non-overlapping channels of 1 and 6 for simultaneous use to effectively double effective bandwidth of the subscribers of the roaming partner. A PCD may authenticate or attempt to authenticate with the subscriber's username, associated with the roaming partner, and may attempt to simultaneously use channels 1, 6, and 11. Thus, tripling the subscriber's bandwidth. This may indicate a fraudulent use. This may also indicate that one or more accounts of the roaming partner may be compromised. The information associated with this authentication or attempted authentication may be used as one or more fraud indicators or may be used in a fraud risk level system, method, or process.

Method of Aggregation

A first roaming partner may have an agreement with a first network provider such that when the first network provider becomes a roaming partner of a second network provider, the first roaming partner's users may roam on the second network providers network. The first network provider may provide authentication services for the first roaming partner's users roaming on the second network provider's network. The second network provider may have a list of such first roaming partners of the first network provider. This list may cause an authentication mechanism to "route" an authentication of a user of a first roaming partner to an authentication server or authentication authority of or associated with the first network provider. Thus, the users of the first roaming partner become virtual users or subscriber of the first network provider. The usage of these virtual subscribers may invoiced directly by the second network provider to the first network provider. The first network provider may, in turn, invoice the first roaming partner for the usage of these virtual subscriber.

While the invention has been particularly shown and described with reference to preferred embodiments, it will be understood by those skilled in the art that various changes in form and detail may be made therein without departing from the spirit and scope of the invention. Any variations, modifications, additions, and improvements to the embodiments described are possible and may fall within the scope of the invention as detailed within the following claims.

What is claimed is:

1. A method, comprising:
receiving a username and a password from a first computing device, wherein the username and the password are associated with a user account of a first network provider;
a second network provider, different from the first network provider, initiating a first network access of the first computing device associated with a first computing device identification;
storing a first set of identification data associated with initiating the first network access in response to initiating the first network access, wherein the first set of identification data comprises the first computing device identification, wherein the first computing device identification includes at least one of a first interne, protocol address, a first media access control identification, a first CPU identification, a first electronic serial number (ESN), a first mobile information number (MIN), a first mobile directory number (MDN), a first cookie identification, and a first certificate identification, wherein the first set of identification data further comprises the username and the password;
receiving the username and the password from a second computing device, wherein the second computing device is different from the first computing device;
the second network provider initiating a second network access of the second computing device associated with a second computing device identification, wherein the second computing device identification is different from the first computing device identification;
storing a second set of identification data associated with initiating the second network access in response to initiating the second network access, wherein the second set of identification data comprises the second computing device identification and the username and the password, wherein the second computing device identification includes at least one of a second interne protocol address, a second media access control identification, a second CPU identification, a second ESN, a second MIN, a second MDN, a second cookie identification, and a second certificate identification;
determining one or more fraud indicators in the first set of identification data and the second set of identification data indicating that the first computing device and the second computing device are different computing devices, wherein the one or more fraud indicators comprise a use of the username and the password with both the first computing device identification and the second computing device identification; and
revoking at least one of the first network access and the second network access in response to determining the one or more fraud indicators.

2. The method of claim 1,
wherein the first set of identification data comprises a first geographic location;
wherein the second set of identification data comprises a second geographic location which is different from the first geographic location; and
wherein the one or more fraud indicators comprise use of the username and the password at both the first geographical location and the second geographical location.

3. The method of claim 1,
wherein the second network access is initiated during the first network access.

4. The method of claim 1,
wherein the second network access is initiated after the first network access has ended.

5. The method of claim 1,
wherein determining the one or more fraud indicators comprises using a fraud detection algorithm.

6. The method of claim 1,
wherein the one or more fraud indicators comprise a use the user account in violation of a threshold quantity of different computing device identifications.

7. The method of claim 1,
wherein the one or more fraud indicators comprise one or more authentication failures during the initiating at least one of the first network access and the second network access in violation of a threshold quantity of authentication failures.

8. The method of claim 1,
wherein the one or more fraud indicators comprise an abnormal rate increase of subscriber usage by a roaming partner.

9. The method of claim 1, further comprising:
determining a rate of network propagation by comparing the first set of identification data and the second set of identification data;
wherein the one or more fraud indicators comprise a violation of a threshold rate of network propagation by the determined rate of network propagation.

10. The method of claim 1,
wherein the one or more fraud indicators comprise a use of one or more RF channels for wireless access during the first network access or the second network access.

11. The method of claim 1, further comprising:
suspending a user account in response to determining the one or more fraud indicators.

12. The method of claim 1, further comprising:
de-activating the user account in response to determining the one or more fraud indicators.

13. The method of claim 12, further comprising:
verifying an owner identification associated with the user account; and
re-activating the user account in response to verifying the owner identification.

14. The method of claim 13,
wherein re-activating the user account is performed by the first network provider.

15. The method of claim 13,
wherein re-activating the user account is performed by the second network provider.

16. The method of claim 13, further comprising assigning at least one of a new username and a new password to the user account.

17. The method of claim 1,
wherein the second set of identification data is received from a broadcast.

18. The method of claim 1,
wherein the second set of identification data is received from a multicast.

19. A method, comprising:
receiving a username and a password from a first computing device, wherein the username and the password are associated with a user account of a first network provider;
receiving a first set of identification data associated with the first computing device, wherein the first set of identification data comprises the username, the password, and a first computing device identification that identifies the first computing device, wherein the first computing device identification includes at least one of a first internet protocol address, a first media access control identification, a first CPU identification, a first electronic serial number (ESN), a first mobile information number (MIN), a first mobile directory number (MDN), a first cookie identification, and a first certificate identification;
receiving the username and the password from a second computing device, wherein the second computing device is different from the first computing device;
receiving a second set of identification data associated with the second computing device, wherein the second set of identification data comprises the username, the password, and a second computing device identification that identifies the second computing device accessing the network, wherein the second computing device identification includes at least one of a second internet protocol address, a second media access control identification, a second CPU identification, a second ESN, a second MIN, a second MDN, a second cookie identification, and a second certificate identification, wherein the second computing device is different from the first computing device, wherein the first computing device identification and the second computing device identification comprise different computing device identifications;
determining, from the first set of identification data and the second set of identification data, a use of the username and the password with both the first computing device identification and the second computing device identification; and
a second network provider, different from the first network provider, revoking at least one of a first network access of a network by the first computing device and a second network access of the network by the second computing device in response to determining, from the first set of identification data and the second set of identification data, the use of the username and the password with both the first computing device identification and the second computing device identification.

20. The method of claim 19,
wherein the second network access is initiated during the first network access.

21. The method of claim 19,
wherein the second network access is initiated after the first network access has ended.

22. The method of claim 19, further comprising:
suspending the user account in response to determining, from the first set of identification data and the second set of identification data, the use of the username and the password with both the first computing device identification and the second computing device identification.

23. The method of claim 19, further comprising:
de-activating the user account in response to determining, from the first set of identification data and the second set of identification data, the use of the username and the password with both the first computing device identification and the second computing device identification.

24. The method of claim 23, further comprising:
verifying an owner identification associated with the user account; and
re-activating the user account in response to verifying the owner identification.

25. The method of claim 24,
wherein re-activating the user account is performed by the first network provider.

26. The method of claim 24,
wherein re-activating the user account is performed by the second network provider.

27. The method of claim 24, further comprising assigning at least one of a new username and a new password to the user account.

28. The method of claim 19,
wherein the second set of identification data is received from a broadcast.

29. The method of claim 19,
wherein the second set of identification data is received from a multicast.

30. An article of manufacture, comprising:
a computer-readable storage medium; and
program instructions stored on the computer-readable storage medium that when executed on a processing system, the processing system;
receives a username and a password from a first computing device, wherein the username and the password are associated with a user account of a first network provider;
stores a first set of identification data associated with a first network access provided by a second network provider, different from the first network provider, wherein the first set of identification data comprises a first computing device identification, wherein the first computing device identification includes at least one of a first internet protocol address, a first media access control identification, a first CPU identification, a first electronic serial number (ESN), a first mobile information number (MIN), a first mobile directory number (MDN), a first cookie identification, and a first certificate identification, wherein the first set of identification data further comprises the username and the password;
receives the username and the password from a second computing device, wherein the second computing device is different from the first computing device;
stores a second set of identification data associated with a second network access provided by the second network provider, wherein the second set of identification data comprises a second computing device identification, the username, and the password, wherein the second computing device identification includes at least one of a second internet protocol address, a second media access control identification, a second CPU identification, a second ESN, a second MIN, a second MDN, a second cookie identification, and a second certificate identification, wherein the first computing device identification and the second computing device identification comprise different computing device identifications;
determines one or more fraud indicators in the first set of identification data and the second set of identification data indicating that the first computing device and the second computing device are different computing devices, wherein the one or more fraud indicators comprise a use of the username and the password with both the first computing device identification and the second computing device identification; and
revokes at least one of the first network access and the second network access in response to determining the one or more fraud indicators.

31. The article of manufacture according to claim 30,
wherein the first set of identification data comprises a first geographic location;
wherein the second set of identification data comprises a second geographic location which is different from the first geographic location; and
wherein the one or more fraud indicators comprise use of the username and the password at both the first geographical location and the second geographical location.

32. The article of manufacture according to claim 30,
wherein the second network access is initiated during the first network access.

33. The article of manufacture according to claim 30,
wherein the second network access is initiated after the first network access has ended.

34. The article of manufacture according to claim 30,
wherein determining the one or more fraud indicators comprises using a fraud detection algorithm.

35. The article of manufacture according to claim 30,
wherein the one or more fraud indicators comprise a use of the user account in violation of a threshold quantity of different computing device identifications.

36. The article of manufacture according to claim 30,
wherein the one or more fraud indicators comprise at least one of one or more authentication failures during the first network access and the second network access in violation of a threshold quantity of authentication failures.

37. The article of manufacture according to claim 30,
wherein the one or more fraud indicators comprise an abnormal rate increase of subscriber usage by the second network provider.

38. The article of manufacture according to claim 30, wherein the program instructions stored on the computer-readable storage medium that when executed on the processing system, the processing system further
determines a rate of network propagation by comparing the first set of identification data and the second set of identification data; and
wherein the one or more fraud indicators comprise a violation of a threshold rate of network propagation by the determined rate of network propagation.

39. The article of manufacture according to claim 30,
wherein the one or more fraud indicators comprise a use of one or more RF channels for wireless access during the first network access or the second network access.

40. The article of manufacture according to claim 30, wherein the program instructions stored on the computer-readable storage medium that when executed on the processing system, the processing system further
suspends the user account in response to determining the one or more fraud indicators.

41. The article of manufacture according to claim 30, wherein the program instructions stored on the computer-readable storage medium that when executed on the processing system, the processing system further
de-activates the user account in response to determining the one or more fraud indicators.

42. The article of manufacture according to claim 41, wherein the program instructions stored on the computer-readable storage medium that when executed on the processing system, the processing system further
verifies an owner identification associated with the user account; and
re-activates the user account in response to verifying the owner identification.

43. The article of manufacture according to claim 42, wherein the program instructions stored on the computer-readable storage medium that when executed on the processing system, the processing system further receives information from the first network provider to re-activate the user account.

44. The article of manufacture according to claim 42, wherein the program instructions stored on the computer-readable storage medium that when executed on the processing system, the processing system further receives information from the second network provider to re-activate the user account.

45. The article of manufacture according to claim 42, wherein the program instructions stored on the computer-readable storage medium that when executed on the processing system, the processing system further
assigns at least one of a new username and a new password to the user account.

46. The article of manufacture according to claim 30, wherein the second set of identification data is received from a broadcast.

47. The article of manufacture according to claim 30, wherein the second set of identification data is received from a multicast.

48. An article of manufacture comprising a computer readable memory medium that includes program instructions, wherein the program instructions are computer-executable to implement:
receiving a username and a password from a first hardware device, wherein the username and the password are associated with a user account of a first network provider;
receiving a first set of identification data associated with a first network access provided by a second network provider, different from the first network provider, wherein the first set of identification data comprises the username, the password, and a first computing device identification that identifies a first hardware device accessing the network, wherein the first computing device identification includes at least one of a first interne protocol address, a first media access control identification, a first CPU identification, a first electronic serial number (ESN), a first mobile information number (MIN), a first mobile directory number (MDN), a first cookie identification, and a first certificate identification,
receiving the username and the password from a second hardware device, wherein the second hardware device is different from the first hardware device;
receiving a second set of identification data associated with a second network access provided by the second network provider, wherein the second set of identification data comprises the username, the password, and a second computing device identification that identifies a second hardware device, wherein the second computing device identification includes at least one of a second interne protocol address, a second media access control identification, a second CPU identification, a second ESN, a second MIN, a second MDN, a second cookie identification, and a second certificate identification, wherein the first computing device identification and the second computing device identification comprise different computing device identifications;
determining, from the first set of identification data and the second set of identification data, a use of the username and the password with both the first computing device identification and the second computing device identification; and
revoking at least one of the first network access and the second network access in response to determining, from the first set of identification data and the second set of identification data, the use of the username and the password with both the first computing device identification and the second computing device identification.

49. The article of manufacture according to claim 48, wherein the second network access is initiated during the first network access.

50. The article of manufacture according to claim 48, wherein the second network access is initiated after the first network access has ended.

51. The article of manufacture according to claim 48, wherein the program instructions stored on the computer readable memory medium that when executed on the processing system, cause the processing system to further perform:
suspending the user account in response to determining, from the first set of identification data and the second set of identification data, the use of the username and the password with both the first computing device identification and the second computing device identification.

52. The article of manufacture according to claim 48, wherein the program instructions stored on the computer readable memory medium that when executed on the processing system, cause the processing system to further perform:
de-activating the user account in response to determining, from the first set of identification data and the second set of identification data, the use of the username and the password with both the first computing device identification and the second computing device identification.

53. The article of manufacture according to claim 52, wherein the program instructions stored on the computer readable memory medium that when executed on the processing system, cause the processing system to further perform:
verifying an owner identification associated with the user account; and
re-activating the user account in response to verifying the owner identification.

54. The article of manufacture according to claim 53, wherein re-activating the user account is performed by the first network provider.

55. The article of manufacture according to claim 53, wherein re-activating the user account is performed by the second network provider.

56. The article of manufacture according to claim 53, wherein the program instructions stored on the computer readable memory medium that when executed on the processing system, cause the processing system to further perform:
assigning at least one of a new username and a new password to the user account.

57. The article of manufacture according to claim 48, wherein the second set of identification data is received from a broadcast.

58. The article of manufacture according to claim 48, wherein the second set of identification data is received from a multicast.

59. A system, comprising:
a CPU coupled to a network;
a memory coupled to the CPU, wherein the memory stores program instructions which when executed by the CPU, the system
receives a username and a password from a first computing device, wherein the username and the password are associated with a user account of a first network provider;
receives a first set of identification data associated with a first network access provided by a second network provider, different from the first network provider, wherein the first set of identification data comprises a first computing device identification, wherein the first computing device identification includes at least one of a first internet protocol address, a first media access control identification, a first CPU identification, a first electronic serial number (ESN), a first mobile information number (MIN), a first mobile directory number (MDN), a first cookie identification, and a first certificate identification;

receives the username and the password from a second computing device, wherein the second computing device is different from the first computing device;

receives a second set of identification data associated with a second network access provided by the second network provider, wherein the second set of identification data comprises a second computing device identification and the username, wherein the second computing device identification includes at least one of a second interne protocol address, a second media access control identification, a second CPU identification, a second ESN, a second MIN, a second MDN, a second cookie identification, and a second certificate identification, wherein the first computing device identification and the second computing device identification comprise different computing device identifications;

determines one or more fraud indicators in the first set of identification data and the second set of identification data that indicate the first computing device and the second computing device are different computing devices, wherein the one or more fraud indicators comprise a use of the username and the password with both the first computing device identification and the second computing device identification; and revokes at least one of the first network access and the second network access in response to determining the one or more fraud indicators.

60. The system of claim 59,
wherein the first set of identification data comprises a first geographic location;
wherein the second set of identification data comprises a second geographic location which is different from the first geographic location; and
wherein the one or more fraud indicators comprise use of the username and the password at both the first geographical location and the second geographical location.

61. The system of claim 59,
wherein the second network access is initiated during the first network access.

62. The system of claim 59,
wherein the second network access is initiated after the first network access has ended.

63. The system of claim 59,
wherein when the system determines the one or more fraud indicators, the system utilizes a fraud detection algorithm.

64. The system of claim 59,
wherein the one or more fraud indicators comprise a use of the user account in violation of a threshold quantity of different computing device identifications.

65. The system of claim 59,
wherein the one or more fraud indicators comprise at least one of one or more authentication failures during the first network access and the second network access in violation of a threshold quantity of authentication failures.

66. The system of claim 59,
wherein the one or more fraud indicators comprise an abnormal rate increase of subscriber usage by the second network provider.

67. The system of claim 59, wherein the program instructions which when executed by the CPU, the system further
determines a rate of network propagation by comparing the first set of identification data and the second set of identification data; and
wherein the one or more fraud indicators comprise a violation of a threshold rate of network propagation by the determined rate of network propagation.

68. The system of claim 59,
wherein the one or more fraud indicators comprise a use of one or more RF channels for wireless access during the first network access or the second network access.

69. The system of claim 59, wherein the program instructions which when executed by the CPU, the system further
suspends the user account in response to determining the one or more fraud indicators.

70. The system of claim 59, wherein the program instructions which when executed by the CPU, the system further
de-activates the user account in response to determining the one or more fraud indicators.

71. The system of claim 70, wherein the program instructions which when executed by the CPU, the system further
verifies an owner identification associated with the user account; and
re-activates the user account in response to verification of the owner identification.

72. The system of claim 71, wherein the program instructions which when executed by the CPU, the system further receives information from the first network provider to re-activate the user account.

73. The system of claim 71, wherein the program instructions which when executed by the CPU, the system further receives information from the second network provider to re-activate the user account.

74. The system of claim 71, wherein the program instructions which when executed by the CPU, the system further assigns at least one of a new username and a new password to the user account.

75. The system of claim 59,
wherein the second set of identification data is received from a broadcast.

76. The system of claim 59,
wherein the second set of identification data is received from a multicast.

77. A system, comprising:
a CPU coupled to a network;
a memory coupled to the CPU, wherein the memory stores program instructions which when executed by the CPU, the system
receives a username and a password from a first computing device, wherein the username and the password are associated with a user account of a first network provider;
stores a first set of identification data associated with a first network access in provided by a second network provider, different from the first network provider, wherein the first set of identification data comprises the username, the password, and a first computing device identification that identifies a first hardware device accessing the network, wherein the first computing device identification includes at least one of a first interne protocol address, a first media access control identification, a first CPU identification, a first electronic serial number (ESN), a first mobile information number (MIN), a first mobile directory number (MDN), a first cookie identification, and a first certificate identification;

receives the username and the password from a second computing device, wherein the second computing device is different from the first computing device and the second user is different from the first user;

stores a second set of identification data associated with a second network access provided by the second network provider, wherein the second set of identification data comprises the username, the password, and a second computing device identification that identifies a second hardware device accessing the network, wherein the second computing device identification includes at least one of a second internet protocol address, a second media access control identification, a second CPU identification, a second ESN, a second MIN, a second MDN, a second cookie identification, and a second certificate identification, wherein the first computing device identification and the second computing device identification comprise different computing device identifications;

determines, from the first set of identification data and the second set of identification data, a use of the username and the password with both the first computing device identification and the second computing device identification; and revokes at least one of the first network access and the second network access in response to determining, from the first set of identification data and the second set of identification data, the use of the username and the password with both the first computing device identification and the second computing device identification.

78. The system of claim 77,
wherein the second network access is initiated during the first network access.

79. The system of claim 77,
wherein the second network access is initiated after the first network access has ended.

80. The system of claim 77, wherein the program instructions which when executed by the CPU, the system further
suspends the user account in response to determining, from the first set of identification data and the second set of identification data, the use of the username and the password with both the first computing device identification and the second computing device identification.

81. The system of claim 77, wherein the program instructions which when executed by the CPU, the system further
de-activates the user account in response to determining, from the first set of identification data and the second set of identification data, the use of the username and the password with both the first computing device identification and the second computing device identification.

82. The system of claim 81, wherein the program instructions which when executed by the CPU, the system further
verifies an owner identification associated with the user account; and
re-activates the user account in response to verification of the owner identification.

83. The system of claim 82, wherein the program instructions which when executed by the CPU, the system further receives information from the first network provider to re-activate the user account.

84. The system of claim 82, wherein the program instructions which when executed by the CPU, the system further receives information from the second network provider to re-activate the user account.

85. The system of claim 82, wherein the program instructions which when executed by the CPU, the system further
assigns at least one of a new username and a new password to the user account.

86. The system of claim 77,
wherein the second set of identification data is received from a broadcast.

87. The system of claim 77,
wherein the second set of identification data is received from a multicast.

88. The method of claim 1, wherein at least one of the first computing device identification and the second computing device identification is associated with a portable computing device.

89. The method of claim 19, wherein at least one of the first computing device identification and the second computing device identification is associated with a portable computing device.

90. The article of manufacture of claim 30, wherein at least one of the first computing device identification and the second computing device identification is associated with a portable computing device.

91. The article of manufacture of claim 48, wherein at least one of the first computing device identification and the second computing device identification is associated with a portable computing device.

92. The system of claim 59, wherein at least one of the first computing device identification and the second computing device identification is associated with a portable computing device.

93. The system of claim 77, wherein at least one of the first computing device identification and the second computing device identification is associated with a portable computing device.

94. A method, comprising:
a first network provider receiving a username and a password from a first computing device associated with a first computing device identification, wherein the username and the password are associated with a user account of a second network provider, wherein the second network provider is different from the first network provider, wherein the first computing device identification includes at least one of a first internet protocol address, a first media access control identification, a first CPU identification, a first electronic serial number (ESN), a first mobile information number (MIN), a first mobile directory number (MDN), a first cookie identification, and a first certificate identification;

the first network provider providing the username and the password to the second network provider for a first authorization of first network access;

the first network provider receiving, from the second network provider, first authorization information indicating that the first network access is permitted;

permitting, based the first authorization information indicating that the first network access is permitted and the first computing device identification, the first network access to the first computing device;

the first network provider receiving the username and the password from a second computing device associated with a second computing device identification, wherein the second computing device identification is different from the first computing device identification, wherein the second computing device identification includes at least one of a second interne protocol address, a second media access control identification, a second CPU identification, a second ESN, a second MIN, a second MDN, a second cookie identification, and a second certificate identification;

the first network provider providing the username and the password to the second network provider for a second authorization of second network access;

the first network provider receiving, from the second network provider, second authorization information indicating that the second network access is permitted; and revoking, based the second authorization information indicating that the second network access is permitted and the first computing device identification, the first network access of the first computing device.

95. The method of claim 94, further comprising:
the first network provider authenticating the username and the password with the second network provider.

96. The method of claim 94,
wherein the first computing device is coupled to a first network; and
wherein permitting the first network access to the first computing device includes permitting access to a second network.

97. The method of claim 96, wherein the second network includes an Internet.

98. The method of claim 96, wherein revoking the first network access of the first computing device includes revoking access to the second network.

99. The method of claim 96, wherein the second computing device is coupled to the first network.

100. The method of claim 96, wherein the second computing device is coupled to a third network.

101. A system, comprising:
a first network operated by a first network provider;
an access controller coupled to the first network, wherein the access controller is configured to be coupled to a second network;
a server configured to: be coupled to at least one of the first network and the second network, receive multiple usernames and multiple corresponding passwords, and communicate with the access controller;
wherein the server
receives a username and a password from a first computing device associated with a first computing device identification and coupled to the first network, wherein the username and the password are associated with a user account of a second network provider, wherein the second network provider is different from the first network provider, and wherein the first computing device identification includes at least one of a first internet protocol address, a first media access control identification, a first CPU identification, a first electronic serial number (ESN), a first mobile information number (MIN), a first mobile directory number (MDN), a first cookie identification, and a first certificate identification; and
communicates first access information to the access controller to permit the first computing device access of the second network;
wherein the access controller
communicates with the server to receive the first access information to permit the first computing device access of the second network; and
permits, based on the username, the password, and the first computing device identification, the first computing device access to the second network;
wherein the server further
receives the username and the password from a second computing device associated with a second computing device identification and coupled to the first network, wherein the second computing device identification includes at least one of a second internet protocol address, a second media access control identification, a second CPU identification, a second ESN, a second MIN, a second MDN, a second cookie identification, and a second certificate identification, and wherein the second computing device identification is different from the first computing device identification; and
communicates second access information to the access controller to permit the second computing device access of the second network; and
wherein the access controller further
communicates with the server to receive the second access information to permit the second computing device access of the second network; and
revokes the access of the first computing device to the second network.

102. The system of claim 101, wherein the access controller further
permits, based on the second computing device identification, the second computing device access to the second network.

103. The system of claim 101, wherein the second network includes an Internet.

104. The system of claim 103,
wherein the server is further configured to be coupled to the second network; and
wherein the access controller and the server communicate via the Internet.

105. The system of claim 101,
wherein the server is operable to be coupled to the second network; and
wherein the access controller and the server communicate via the second network.

106. The system of claim 101, wherein the access controller includes the server.

107. The system of claim 101, wherein at least one of the first computing device identification and the second computing device identification is associated with a portable computing device.

108. The system of claim 101,
wherein the server further
receives the username and the password from a third computing device associated with a third computing device identification, different from the second computing device identification, and coupled to a third network, wherein the third computing device identification includes at least one of a third internet protocol address, a third media access control identification, a third CPU identification, a third ESN, a third MN, a third MDN, a third cookie identification, and a third certificate identification; and
communicates information to the first network provider, wherein the information indicates that access to the second network has been permitted to the third computing device;

wherein the access controller further revokes the access of the second computing device to the second network in response to the information communicated to the first network provider.

109. The system of claim 108, wherein the third network is operated by the first network provider.

110. The system of claim 108, wherein the third network is operated by a third network provider that is different from the first network provider.

* * * * *